United States Patent

Patil et al.

Patent Number: 5,376,153
Date of Patent: Dec. 27, 1994

[54] HETEROCYCLIC NITROGEN COMPOUND MANNICH BASE DERIVATIVES OF AMINO-SUBSTITUTED POLYMERS FOR OLEAGINOUS COMPOSITIONS

[75] Inventors: Abhimanyu O. Patil, Westfield; Sudhin Datta, Matawan; Robert D. Lundberg, Bridgewater, all of N.J.

[73] Assignee: Exxon Chemical Patents Inc., Linden, N.J.

[21] Appl. No.: 147,657

[22] Filed: Nov. 4, 1993

Related U.S. Application Data

[62] Division of Ser. No. 490,798, Mar. 8, 1990, Pat. No. 5,271,856.

[51] Int. Cl.$^5$ .............................................. C10L 1/22
[52] U.S. Cl. ............................................ 44/330; 44/333; 44/340
[58] Field of Search .......................... 44/330, 333, 340

[56] References Cited

U.S. PATENT DOCUMENTS 4,784,782  11/1988  Pialet et al. ........................ 44/330
5,271,856  12/1993  Patil et al. ........................ 544/180

*Primary Examiner*—Jacqueline V. Howard
*Attorney, Agent, or Firm*—U. T. White

[57] ABSTRACT

The novel polymers of the present invention are prepared by reacting a heterocyclic nitrogen compound containing at least one —N(H)— group in the ring, an aldehyde and amino-substituted polymer (e.g., an ethylene alpha-olefin interpolymer substituted by primary amino or secondary amino groups) to form an oil soluble Mannich base derivative useful as antioxidant additive in oleaginous compositions such as lubricating oils and fuels. Preferred heterocyclic nitrogen compound are azoles such as benzotriazoles and alkyl-substituted benzotriazoles. Preferred amino-substituted interpolymers comprise amino-substituted ethylene propylene norbornene terpolymers. The polymers of this invention are oil soluble and are useful as dispersants, viscosity index improver dispersants, and as antiwear and antioxidant additives in oleaginous compositions.

41 Claims, 1 Drawing Sheet

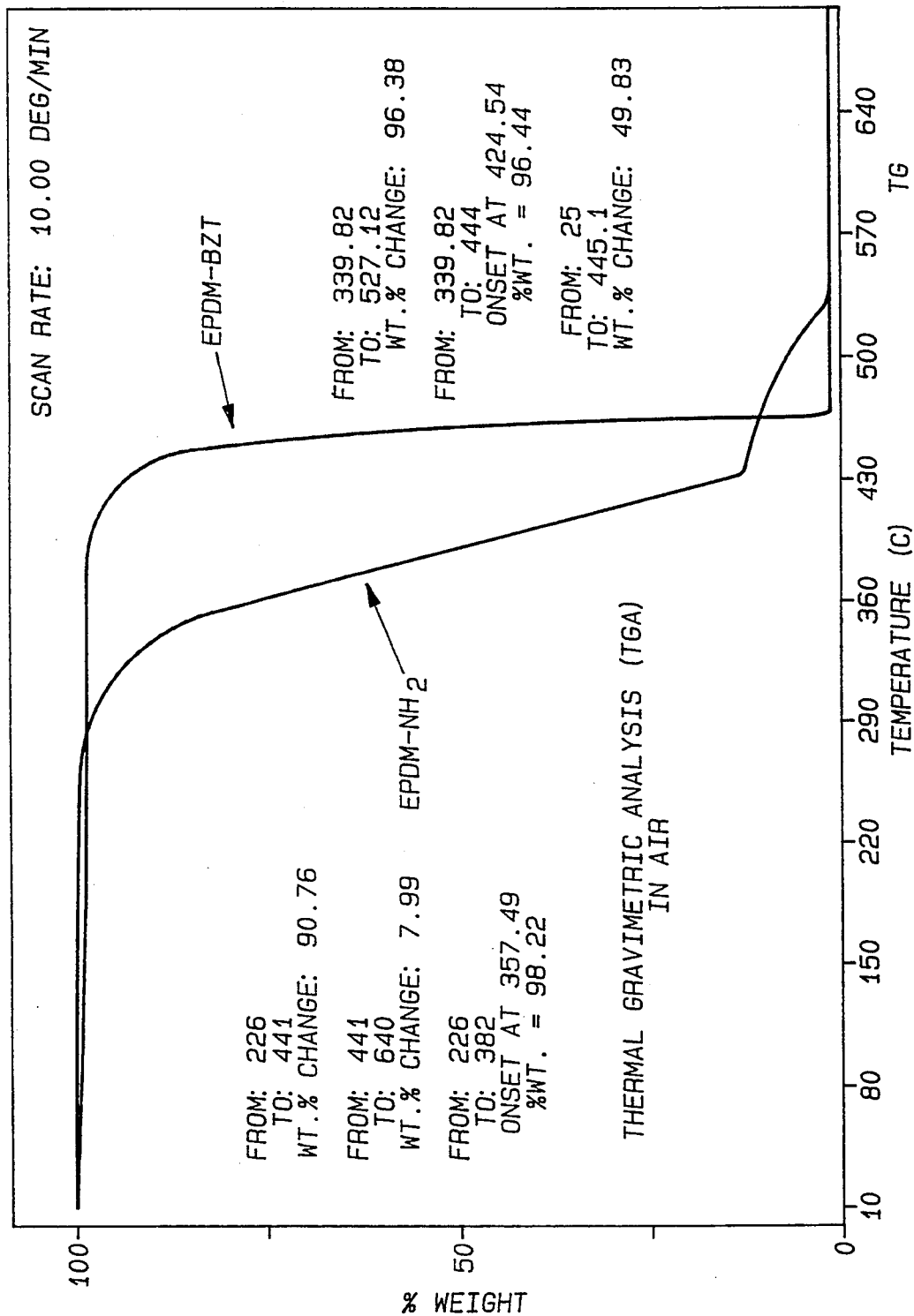

HETEROCYCLIC NITROGEN COMPOUND MANNICH BASE DERIVATIVES OF AMINO-SUBSTITUTED POLYMERS FOR OLEAGINOUS COMPOSITIONS

This is a division, of application Ser. No. 490,798, filed Mar. 8, 1990, now U.S. Pat. No. 5,271,856,

BACKGROUND OF THE INVENTION

1. Field of the Invention

The present invention relates to oil-soluble Mannich base materials useful as dispersant, antiwear and antioxidant additives for oleaginous compositions derived from amino-substituted polyolefin polymers and heterocyclic nitrogen compounds 2. Discussion of Background and Material Information U.S. Pat. No. 3,632,600 relates to aliphatic-hydrocarbyl substituted heterocyclic nitrogen compounds useful as detergents and antioxidants for lubricant and fuel compositions, there being attached to a carbon atom or to a nitrogen atom of the heterocyclic ring a hydrocarbyl group having about 20-150 carbon atoms. The preparation of N-polyisobutenyl pyrrole, N-polyisobutenyl pyrazole and N-polyisobutenyl benzotriazole (from polyisobutenyl chloride and the corresponding heterocyclic compound, pyrrole, pyrazole and benzotriazole, respectively) is described.

U.S. Pat. Nos. 3,788,993 and 3,884,932 relate to hydrocarbon lubricant compositions containing the reaction product of an alkyl or alkenyl succinic anhydride and a benzotriazole or substituted benzotriazole which are reacted in mole ratios of from 1:1 to 1:2.

U.S. Pat. No. 3,846,3 18 relates to lubricating oil additives produced by the reaction of mercaptobenzothiazole, an aldehyde and a phenol, which may be alkylated with a $C_1$-$C_{24}$ alkyl group.

U.S. Pat. No. 3,897,351 relates to lubricant compositions containing an amine salt of the reaction product of an alkyl or alkenyl succinic anhydride and a benzotriazole or substituted benzotriazoles (employed in the mole ratio of from 1:1 to 1:2).

U.S. Pat. No. 4,148,605 relates to rust/corrosion inhibitors prepared by condensing a $C_8$ to $C_{28}$ alkenyl succinic anhydride with a $C_2$ to $C_{18}$ aliphatic hydroxy acid to form an ester-acid which can then be converted to amine salts. Suitable amines include triazoles such as benzotriazole and tolyl triazole.

U.S. Pat. No. 4,153,564 relates to additives for lubricants for fuels prepared by the reaction of an aromatic triazole, aldehyde and a product formed from alkenyl succinic anhydrides or acids and aniline-aldehyde resins. The product is disclosed to be characterized by —$CH_2$-triazole moieties as substituents to the aromatic groups of the aniline-aldehyde resin chains.

U.S. Pat. No. 4,212,754 relates to detergent and antiwear metal chelates prepared by (1) reacting a benzotriazole with a monoepoxide, (2) reacting the resulting hydroxyalkyl benzotriazole with an alkenyl succinic anhydride to form a monoester, and (3) converting the monoester to the salt of a metal which can form Werner complexes and complexing with a ligand-containing amine, hydroxyl, oxazoline or imidazoline groups to form the chelate.

U.S. Pat. No. 4,734,209 relates to metal deactivators formed by reaction between a triazole, formaldehyde and certain hydrocarbyl amines.

U.S. Pat. No. 4,820,776 relates to fuel oils and lubricants having improved properties containing ethylene-propylene copolymer bearing units derived from N-vinyl pyrrolidone and a second functional monomer which can comprise phenothiazines, imidazoles, benzimidazoles, thiazoles, benzothiazoles, triazoles, benzotriazoles, thiadiazoles, and other heterocyclic materials.

U.S. Pat. No. 4,855,074 relates to homogeneous additive concentrates useful in lubricating oils formed by heating a long chain succinimide and a benzotriazole in the presence of water, alkoxylated amines, dihydrocarbyl phosphites or dihydrocarbyl phosphites, and optionally also in the presence of a boronating agent and distilling the volatile components from the product.

U.S. Pat. No. 4,859,355 relates to a lubricant additive made by reacting a preformed Mannich base (prepared from a phenol, a $C_1$-$C_8$ alkyl aldehyde and a lower boiling point amine) in a displacement reaction with a reactive hydrocarbyl amine, thiol or dithiophosphoric acid having at least one reactive hydrogen. Amines suitable in the preformed Mannich base or in the displacement reaction are indicated to include benzotriazole and tolyltriazole.

U.K. Patent 1,061,904 relates to additives for lubricating compositions or hydraulic fluids prepared by reacting an imidazole or triazole with formaldehyde and a secondary mono-amine.

U.K. Patent 1,514,359 relates to additives for functional fluids prepared by reacting a monoamine, aldehyde and a compound which can comprise an alkaline-, cycloalkaline-, carbonyl-, sulphuryl-, —O -or —S- linked benzotriazole or benzimidazole. The monoamines are disclosed to include primary and secondary alkyl or alkenyl-substituted monoamines wherein the alkyl or alkenyl group has from 2-20 carbon atoms.

U.K. Patent Publication 2,069,505 relates to benzotriazole compositions prepared by reacting a benzotriazole and a water-insoluble aliphatic amine, of which tertiary alkyl primary amines and oil soluble basic nitrogen-containing dispersants (e.g., polyisobutenyl succinimides) are preferred.

U.K. Patent Publication 2,071,139 relates to sulfurized olefin compositions comprising (A) at least one benzotriazole or a benzotriazole-aliphatic amine reaction product and (B) a sulfurization product of at least one aliphatic or alicyclic $C_3$-$C_{30}$ olefinic compound. The benzotriazole-aliphatic amine reaction product can be derived by reacting a benzotriazole with primary, secondary or tertiary monoamines, with polyamine, or with an oil-soluble basic nitrogen-containing dispersant.

Japanese Patent Publications 58-52,393; 58-189,195; 60-194,087 disclose the preparation of additives for lubricating oils prepared by reacting an aldehyde, a monoamine and either benzotriazole or alkyl-substituted derivatives of benzotriazole.

Japanese Patent 84-021918 (87 Chem. Abs. 120403b) relates to lubricating oils with improved corrosion inhibiting properties containing alkenyl succinimides and benzotriazole.

Polymers prepared from alpha-olefins using Ziegler catalysts have found acceptance for use in a wide range of applications including elastomers, fibers and films. Inasmuch as the polymers are essentially nonpolar, however, they have a characteristic inertness which makes them difficult to surface treat, for example, by dyeing or metallizing techniques. Additionally, they are limited in the amount of additives, such as stabilizers and plasticizers which they can accommodate without "blooming". Similar limitations are found in the rubbery copolymers and terpolymers produced from alpha-olefins.

In an attempt to overcome these disadvantages, efforts have been made to introduce polar functional groups into such polyolefins, both homo and copolymers. Previous efforts in this direction have included both the direct incorporation of functionalized monomers during the polymerization process as well as post-polymerization functionalization of polymers.

Efforts have been made to incorporate polar monomers directly into the polymer using various techniques. U.S. Pat. No. 3,492,277 discloses a method for forming a complex of a polar monomer containing a labile hydrogen, as in $-NH_2$, $-COOH$, or $-OH$, by contacting the polar monomer in an inert hydrocarbon solvent with an organo-aluminum compound at a molar ratio of polar monomer to organo-aluminum compound of from 1:1 to 1:3, and then heating the solution to between 60° and 150° C. The organic aluminum compounds disclosed have the general formulas $AlR_1R_2R_3$ or $AlR_1R_2X'$ wherein $R_1$, $R_2$ and $R_3$ are the same or different alkyl or aryl radicals and $X'$ is either chlorine or bromine. The method disclosed is alleged to be useful with a wide range of monomers including those having polar groups such as $-COOR'$, $-CHO$, $-SH$ and $-SO_3H$. The polar monomers have the general formula:

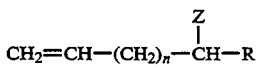

wherein n is an integer greater than 2, R is hydrogen, an alkyl or aryl radical, and Z is the polar moiety. Z can also be an aromatic nucleus bearing such moieties. Although $R_1$, $R_2$ and $R_3$ are generally described as being the same or different aryl or alkyl radicals, this patent does not disclose that non-halogenated organoaluminum compounds affect the results achieved and otherwise disclose and illustrate the procedure by way of examples wherein a halogenated organoaluminum compound is used.

Reaction of the organoaluminum compound with the polar monomer results in a polar monomer reaction product complex, e.g. 5-hydroxy-1-pentene and diethyl aluminum chloride

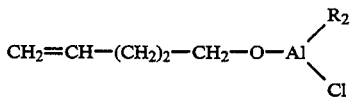

with the elimination of an alkyl or aryl radical from the organoaluminum compound. The complex can then be combined with alpha-olefin and Ziegler catalyst (titanium trichloride) for the polymerization. The polymerization is carried out at about 60° C. to about 100° C. The ratio of the preferred aluminum compound, diethylaluminum chloride, to titanium trichloride is 10:1 to 1:1.

U.S. Pat. No. 4,423,196 discloses a method of incorporating acyclic polar monomers into an alpha-olefin copolymer using an aluminum compound of the formula $AlR_nX'_{(3-n)}$ wherein R is a $C_1-C_{18}$ alkyl group, $X'$ is halogen and $0 < n \leq 3$. The polar monomer is contacted at room temperature with one mole of organoaluminum compound, and then allowed to react for 1 hour at 70° C. Polymerization is carried out using $TiCl_3$ as the Ziegler catalyst, the ratio of organoaluminum to $TiCl_3$ is 1:1 to 100:1. Polymerization is carried out at about 20° C. to 100° C. and preferably about 60° C. to 90° C. Illustrative of the polar monomers disclosed are eugenol and undec-1-enoic acid. The disclosure of EPO Patent Application No. 14, 822 is similar in scope, but also discloses ethylene as a compound considered to be an alpha-olefin.

Matsumura, K. and Fukumoto, O., J. Pol. Sci., 9, 471–483 (1971) discloses the copolymerization of propylene using a Ziegler-Natta type catalyst (equimolar quantities of $TiCl_3$ and triethyl aluminum) in the presence of ethylchloro-aluminum acrylate, which was formed by the reaction of acrylic acid with diethyl aluminum chloride under $N_2$ at room temperature with cooling.

An article by Spevak, L. L.; Ivanochev, S. S.; et al. entitled, "Copolymerization of Ethylene with Acrylic Acid and Its Derivatives Using the Catalyst System $Al(C_2H_5)_2Cl$—$VO(OC_2H_5)_3$" (Sci.-Ind. Enterp. "Plastpolim", Leningrad, USSR), Plaste Kautsch, 29(1), 12–15, 1982, discloses the preparation of ethylene/acrylic acid copolymers. An excess of organo aluminum compound is utilized both to complex the acrylic acid and to act as a cocatalyst for the $AlEt_2Cl$—$VO(OEt)_3$ polymerization catalyst system. Complexing of the acrylic acid is accomplished in situ during the polymerization process.

U.S. Pat. No. 3,796,687 discloses the preparation of ethylene-alpha-olefin-nonconjugated diene terpolymers using as a fourth monomer a polar compound of the formula: $CH_2=CH-(CH_2)_n-Y$ wherein n is an integer from 0 to 20 and Y is a functional group which can be

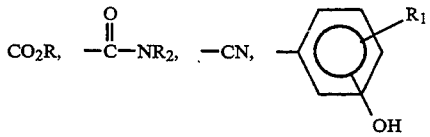

and $-SO_2Cl$ where R is H, alkyl, aryl or cycloalkyl containing 1 to 18 carbon atoms and $R_1$ is either $-R$ or $-OR$. Other polar compounds disclosed include bridged ring compounds (substituted norbornene) and substituted aromatic compounds. The substituents include those described above as well as alcohols. The polymerization catalyst comprises a vanadium compound and an organoaluminum cocatalyst in conjunction with a halogenated compound (e.g., hexachloropropylene) as catalyst reactivator. The ratio of aluminum compound to vanadium compound is at least 2:1 preferably 10:1. The polymerization is conducted by dissolving ethylene and a comonomer alpha-olefin in the reaction solvent, the alkylaluminum compound is then added, followed by addition of the unsaturated functional monomer and any diene, then any catalyst reactivator, and finally the varadium compound.

U.S. Pat. Nos. 3,884,888, 3,901,860, and 4,017,669 are related to U.S. Pat. No. 3,796,687 and have substantially the same disclosures. U.S. Pat. No. 3,884,888 is directed to EPDM which contains as a fourth monomer, a bridged ring compound, e.g., norbornene substituted with a group defined as being $-(CH_2)_n-Z$ where n is 0 to 20 and Z is

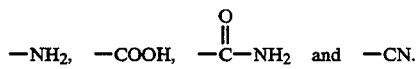, 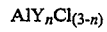 and —CN.

U.S. Pat. No. 3,901,860 is directed toward EPDM wherein the substituent is similar to that of U.S. Pat. No. 3,884,888 except that Z is COOH. U.S. Pat. No. 4,017,669 claims as the fourth monomer the same bridged ring structure of U.S. Pat. No. 3,884,885 and U.S. Pat. No. 3,901,860 except that the substituent is —($CH_2$-)$_n$—COOR, wherein n is 0–20 and R can be alkyl, aryl, or cycloalkyl.

Japanese Patent No. JA 7337756-R discloses the copolymerization of an alpha-olefin with an unsaturated carboxylic acid of the formula $CH_2$=CH—($CH_2$-)$_n$—COOH. The polymerization catalyst is a halide of Ti or V and an organoaluminum compound. The organoaluminum compound can be of the formula $R_3Al$, $R_2AlX$, $RAlX_2$ $R_2AlOR'$, $RAl(OR')X$ and $R_3Al_2X_3$ where R and R' are alkyl or aryl and X is halogen. The polymerization is effected at 0°–130° C. and 0–50 atmospheres. There is no prereaction of the aluminum compound with the carboxylic acid compound.

U.S. Pat. No. 3,761,458 discloses a process applicable to alpha-olefin containing polar monomers in which the polar groups are separated from the alpha-olefin by two or more carbon atoms. The polar monomer can contain more than one polar group. The polar group can be one of the amino, cyano, phosphine, (hydrocarb)oxy, metal-metalloid-containing groups, as well as metal salts of acid groups such as —COOH, —$SO_3H$, —PO(OR)OH, carboxyl groups, or hydrocarbyl sulfide groups. An essential component of the catalyst system is the halide or alkoxyhalide of a transition metal e.g., $TiCl_3$. The preferred cocatalyst is an aluminum alkyl. Other catalysts include vanadium trichloride, zirconium tetrachloride etc. The aluminum compound has the formula $AlR_3$ or $RR'AlX$ wherein R is hydrocarbyl, R' is H or hydrocarbyl and X is halogen, H, alkoxy, aryloxy etc. All monomers and catalyst components are added to the reaction and there is no preference as to order of addition of the monomers. The preferred alkyl groups of the catalyst component is ethyl, but n-propyl, isopropyl, n-butyl, isobutyl, n-octyl or 2-ethyhexyl groups are taught as suitable.

U.S. Pat. No. 4,139,417 discloses amorphous copolymers of mono-olefins or of mono-olefins and non-conjugated dienes with unsaturated derivatives of imides. The polymer comprises about 99.9 to 80 weight percent of non-polar units derived from at least two mono-olefins containing 2 to 18 carbon atoms, particularly ethylene and propylene, and optionally one more non-conjugated diene. In the preparation of the polymer the imide is complexed with a Lewis acid, e.g., alkyl-aluminum dihalides, aluminum trihalides, boron halides nickel halides. It is indicated that the Lewis acid-imide complex has a higher stability than that of the reaction products which the non-saturated imide may form with components of the coordination catalyst system used for the copolymerization. The complex between the Lewis acid and the unsaturated imide may be formed before being introduced into the polymerization zone, by dissolving the imide and Lewis acid in an inert solvent maintained at −80° C. to +80° C. Catalyst systems which are disclosed as being particularly suitable for the preparation of the copolymers are formed by the association of an organoaluminum compound with titanium, vanadium, tungsten or zirconium derivatives e.g. halides or oxyhalides. The organoaluminum compound may have the formula $$AlY_nCl_{(3-n)}$$

wherein n is 1, 3/2, 2 or 3 and Y is a lower alkyl group, e.g., $C_2$–$C_6$ alkyl, the aluminum compound being associated with a titanium halide, vanadium halide or vanadium oxyhalide.

Japanese Patent Application No. 188996/1982 (Laid Open No. 80413/1984; 5/9/84) discloses a process for preparing a copolymer of an olefin and a polar vinyl monomer which comprises copolymerizing an olefin with a complex of the polar vinyl monomer and a Lewis acid. The amount of Lewis acid is in excess of an equimolar amount of polar monomer. The Lewis acid is represented by the general formula $R_mMX_n$ wherein R is a hydrocarbyl group; M is B, Al or Sn; X is halogen, and n is greater than zero. Illustrative of the Lewis acid are ethylaluminum dichloride, aluminum chloride, boron trichloride and tin chloride. The polar vinyl monomer is an ester of an unsaturated alcohol and an organic acid. The catalyst component used in the copolymerization process comprises magnesium, titanium, halogen and an electron donor. It is prepared by heating or copulverizing a combination of magnesium or a magnesium compound, a titanium compound and an electron donor.

Japanese Patent Application No. 152767/1982 (Laid Open No. 43003/1984, 5/19/84) is similar in scope to Japanese Application No. 188997/1982. The catalyst of Japanese Patent Application No. 1532767/1982 however, comprises a reduced titanium tetrachloride with an organoaluminum compound activated by an electron donor such as ether, ester, amine and/or a halogen containing compound. Illustrative of halogen containing compounds are the tetrachlorides of titanium, silicon and tin; hydrogen halide, halogens and halogenated hydrocarbon.

European Patent Application No. 295,076 relates to polyolefins incorporating carboxyl, hydroxyl, thio, amino, carbonyl and imino functional groups, masked functional group-containing monomers and methods for preparing the same, by reacting the functional group containing monomers with non-halogenated organometallic compounds to form masked, functional-group containing monomers, and polymerizing polymer chain monomers with the masked monomers to produce a polymer chain.

SUMMARY OF THE INVENTION

The novel polymers of the present invention are prepared by reacting (A) at least one heterocyclic nitrogen compound containing at least one —N(H)— group in the ring, (B) at least one aldehyde and (C) at least one amino-substituted polymer (e.g., an ethylene alpha-olefin interpolymer) substituted by primary amino or secondary amino groups to form an oil soluble Mannich base derivative useful as viscosity index improver-dispersant, dispersant, antiwear and antioxidant additive in oleaginous compositions such as lubricating oils and fuels. Preferred heterocyclic nitrogen compound are azoles such as benzotriazoles and alkyl-substituted benzotriazoles. Preferred amino-substituted interpolymers comprise amino-substituted ethylene propylene norbornene terpolymers. Such amino-substituted interpolymers can be prepared by co-polymerizing ethylene (and, optionally, an alpha-olefin) with a masked nitrogen-containing monomer wherein the primary or secondary nitrogen group of the nitrogen-containing monomer is masked with an organometallic compound (preferably, a non-halogenated organometallic compounds), followed by deashing the resulting interpolymer to remove the organometallic compound and thereby form the amino-substituted interpolymer. Other useful amino-substituted polymers can be prepared by halogenation of a polyolefin, followed by amination of the halogenated polyolefin.

One object of the present invention is the production of azole Mannich Base-grafted olefin polymers including polymer chain monomers and nitrogen-containing monomers having a substantially uniform level of functionality among the polymer chains.

A still further object of the present invention is the production of azole Mannich Base-grafted olefin polymers including polymer chain monomers and nitrogen-containing monomers which are essentially devoid of organic halides.

Another object of the present invention is to provide a method for forming an azole Mannich Base-grafted polymer chain of polymer chain monomers and nitrogen-containing monomers which involves reacting a nitrogen-containing monomer with a non-halogenated metallic compound to formed masked, nitrogen-containing monomers, polymerizing polymer chain monomers with the masked group containing monomers to produce the polymer chain containing primary or secondary amine groups and reacting these amine groups with an azole and aldehyde to form an oil soluble Mannich base derivative having viscosity index improver-dispersant, dispersant, antiwear and antioxidant properties.

Another further object of the present invention is to provide a method for forming an azole Mannich Base-grafted polymer chain of olefins, referred to herein as polymer chain monomers, and nitrogen-containing monomers, which involves (a) reacting (i) nitrogen-containing monomers having a general formula of:

$$R^1(X)_n$$

wherein $R^1$ is selected from the group consisting of ethylenically unsaturated hydrocarbyl radicals, n is an integer, and X is selected from the group consisting of primary amino, secondary amino, imino and cyano groups with (ii) non-halogenated metallic compounds to form masked, nitrogen-containing monomers; (b) polymerizing polymer chain monomers with the masked, nitrogen-containing monomers to produce the polymer chain, containing primary or secondary amine groups; and (c) reacting these amine groups with an azole and aldehyde to form an oil soluble Mannich base derivative having viscosity index improver-dispersant, dispersant, antiwear and antioxidant properties.

The non-halogenated metallic compound used for purpose of the present invention is an organometallic compound of the formula:

$$M(Y)_r$$

wherein M is a member selected from Group IIA, IIB, IIIA, IVA, and the transition metal elements and is preferably an element selected from a group consisting of aluminum, magnesium, and zinc, and wherein r is an integer from 1 to 4 and is selected so as to satisfy the valence for metal M, and Y is at least one of $R^2$, $R^3$, $R^4$, $R^5$, wherein $R^2$–$R^5$ are (preferably independently) selected from the group consisting of hydrogen and $C_1$–$C_{16}$ hydrocarbyl, which may or may not contain unsaturation, including $C_1$–$C_{16}$ alkyl, $C_6$–$C_{16}$ aryl, $C_1$–$C_{16}$ alkoxy, provided that at least one of $R^2$–$R^5$ is not hydrogen. Exemplary of preferred $R^2$–$R^5$ groups are members selected from the group consisting of hydrogen, methyl, ethyl, diethyl, propyl, isopropyl, butyl, isobutyl, tertiary butyl, pentyl, and hexyl, and phenyl. Suitable organometallic compounds are diethylzinc, and di-n-hexyl-magnesium, with triisobutylaluminum, triethylaluminum, and diisobutyl aluminum hydride being preferred.

BRIEF DESCRIPTION OF THE DRAWING

FIG. 1 is a graphical plot of the thermal gravimetric analysis of a benzotriazole amino-substituted interpolymer Mannich base adduct of this invention, as compared to the amino-substituted interpolymer itself, as described in Example 6.

DETAILED DESCRIPTION OF THE INVENTION

Preparation of the Amino-Substituted Interpolymer

The amino-substituted polymers used in this invention can comprise amino-substituted interpolymers which can be prepared by the direct incorporation of masked, nitrogen-containing monomers (MNCM) into homopolymers and copolymers, such as polyolefins and particularly ethylene-propylene copolymers (EPM), to form copolymers, terpolymers and tetrapolymers containing the MNCM. The nitrogen-containing monomer (NCM) is an unsaturated compound which is copolymerizable with polymer chain monomers (PCM), viz. olefins such as ethylene and propylene (described in more detail below), using a Ziegler catalyst. The nitrogen-containing monomer is preferably masked in a reaction with non-halogenated metallic compounds under controlled conditions and is then contacted with polymer chain monomers for production of the amino-substituted interpolymer. The amino-substituted polymers preferably comprise polymer chains exhibiting a generally uniform distribution of amino functionality and a low halogen content and are essentially devoid of organic halides.

Polymer Chain Monomers

The term polymer chain monomer (PCM) as used in the specification and claims includes conventional monomers normally used in the production of polymers. The polymer chain monomers used in the method for forming an amino-substituted interpolymer in accordance with the present invention are preferably selected from a group consisting of ethylene and $C_3$–$C_{25}$ alpha-olefins. The alpha-olefins suitable for use may be branched or straight chained, cyclic, and aromatic substituted or unsubstituted, and are preferably $C_3$–$C_{16}$ alpha-olefins. Mixed olefins can be used (e.g., mixed butenes).

The alpha-olefins, when substituted, should not be aromatic substituted on the 2-carbon position (e.g., moieties such as $CH_2=CH-\phi-$ should not be employed), since such an aromatic group interferes with the subsequent desired polymerization. Illustrative of such substituted alpha-olefins are compounds of the formula $H_2C=CH-C_bH_{2b}-T$ wherein "b" is an integer from 1 to 20 carbon atoms (preferably to 10 carbon atoms), and T comprises aryl, alkaryl, or cycloalkyl. Exemplary of such T substituents are aryl of 6 to 10 carbon atoms (e.g. phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like), alkaryl of 7 to 15 carbon atoms (e.g. tolyl, xylyl, ethylphenyl, diethylphenyl, ethyl-naphthyl, and the like). Also useful are alpha-olefins substituted by one or more such X substituents wherein the substituent(s) are attached to a non-terminal carbon atom, with the proviso that the carbon atom so substituted is not in the 1- or 2-carbon position in the olefin, in addition to alkyl-substituted bicyclic and bridged alpha-olefins of which $C_1$-$C_9$ alkyl substituted norbornenes are preferred (e.g., 5-methyl-2-norbornene, 5-ethyl-2-norbornene, 5-(2'-ethylhexyl)-2-norbornene, and the like).

Illustrative non-limiting examples of preferred alpha-olefins are propylene, 1-butene, 1-pentene, 1-hexene, 1-octene, and 1-dodecene. The alpha-olefin is generally incorporated into the amino-substituted interpolymer in an amount of about 10 to about 90 wt %, more preferably at about 20 to about 70 wt %. The amino-substituted interpolymer may optionally contain a third type of polymer chain monomer which is an easily polymerizable non-conjugated diene. Non-conjugated dienes suitable for purposes of the present invention can be straight chain, hydrocarbon di-olefins or cycloalkenyl-substituted alkenes, having about 6 to about 15 carbon atoms, for example:

A. straight chain acyclic dienes, such as 1,4-hexadiene and 1,6-octadiene;

B. branched chain acyclic dienes, such as 5-methyl-1,4-hexadiene; 3,7-dimethyl-1,6-octadiene: 3,7-dimethyl-1,7-octadiene; and the mixed isomers of dihydro-myricene and dihydro-ocinene;

C. single ring alicyclic dienes, such as 1,3-cyclopentadiene; 1,4-cyclohexadiene; 1,5-cyclo-octadiene and 1,5-cyclododecadiene;

D. multi-ring alicyclic fused and bridged ring dienes, such as tetrahydroindene; methyl-tetrahydroindene; dicyclopentadiene; bicyclo-(2.2.1)-hepta-2,5-diene; alkenyl, alkylidene, cycloalkenyl and cycloalkylidene norbornenes, such as 5-methylene-2-norbornene (MNR), 5-propenyl-2-norbornene, 5-isopropylidene-2-norbornene, 5-(4-cyclo pentenyl)-2-norbornene, 5-cyclohexylidene-2-norbornene, and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, 1,4-hexadiene, 5-methylene-2-norbornene, and 5-ethylidene-2-norbornene. Particularly preferred diolefins are 5-ethylidene-2-norbornene (ENB) and 1,4-hexadiene. The non-conjugated diene is incorporated into the amino-substituted interpolymer in an amount of from about 0.5 to about 15 wt %; more preferably, from about 1 to about 10 wt %, e.g., 5 wt %.

Nitrogen Containing Monomers

As used in the specification and claims, the term nitrogen-containing monomer (NCM) means the unsaturated, nitrogen-containing monomers of this invention which contain at least one primary amino, secondary amino, imino, and/or cynano group having the general formula:

wherein $R^1$ is selected from ethylenically unsaturated hydrocarbyl radical s, and X is selected from the group consisting of amino (—N(H)R') groups, imino groups (—CH=N—R'), and cyano (—C≡N) moieties, and wherein n is an integer of at least 1, preferably 1–4, and more preferably 1–2. R' in the above groups can comprise H or hydrocarbyl (preferably H or saturated hydrocarbyl), e.g. of 1 to 15 carbon atoms, and preferably alkyl of 1 to 5 carbon atoms, cycloalkyl of from 3 to 7 carbon atoms, and the like. Exemplary of such amino groups are —$NH_2$ and alkyl amino groups, e.g., —$NHCH_3$, —$NHC_2H_5$, —$NHC_3H_7$, —$NHC_4H_9$, and the like.

The unsaturation in $R^1$ is such that it is easily polymerized by Ziegler catalysts employed in the practice of this invention. As used herein $R^1$ preferably contains from 2 to 25 carbon atoms, and preferably from 2 to 16 carbon atoms. In particular, $R^1$ is selected from the group consisting of radicals derived from ethylene, alpha-olefins, homologues of alpha-olefins, norbornene and homologues of norbornene, or from the group consisting of vinyl and allyl radicals. Representative examples of such unsaturation are alpha-olefin types shown as (M1) and the unsaturation in the norbornene system shown as (M2):

wherein R" comprises norbornyl, m is an integer of from 1 to 30, and p is an integer of from 1 to 30. Preferably m and p are integers of from 0 to 12. More preferably m is 0, 1, or 2, and p is 1, 2, or 3. It will be understood that the —$C_mH_{2m}$— and —$C_pH_{2p}$— groups can be branched or straight chained, and that the norbenene ring can be substituted with the —$C_pH_{2p}$— group at the C-2 or C-7 position, i.e. R" can comprise bicyclo [2.2.1] hept-5-en-2-yl, or bicyclo [2.2.1]- hept-2-en-7-yl, respectively. $R^1$ preferably contains from 2 to 25 carbon atoms, and is selected preferably from one of the two classes shown in (M1) and (M2). Suitable examples from the alpha-olefin unsaturation type includes vinyl, allyl and the higher homologues as represented by integral values of m. Suitable examples of the norbornene unsaturation type include norbornene and its higher homologues represented by integral values for p. More preferably, $R^1$ may contain up to 16 carbon atoms. Preferably, n is the number of functionality sites per NCM and has non-zero integral values between 1 and 5, and more preferably between 1 and 3.

The NCM is preferably soluble in the liquid hydrocarbon solvent or diluent selected for use in the subsequent polymerization reaction (e.g., saturated hydrocarbon solvents, such as hexane).

Exemplary of nitrogen-containing monomers are members selected from the group consisting of norbornenyl-methyl amines and imines and preferably 5-norbornenyl-2-methylamine, 5-norbornene-2,3-dimethylamine, 5-norbornene-2-ethylamine, 5-norbornene-2-(4'-butenyl) imine and the like, and norbornenyl-nitriles, such as 5-norbornene-2-nitrile, 5-norbornene-2,3-dinitrile, and the like.

The NCM may also include multiple functionality, that is the $R^1$ moiety may be substituted by more than one "X" group, in which case the functional "X" groups may be the same or different.

The hydrocarbyl radical in the NCM will preferably be norbornyl, or vinyl, in structure with particular preference for norbornyl functionalized at the C-2 position or alpha-olefins functionalized at the C-3 position. Notwithstanding the previously mentioned preferred unsaturated, nitrogen-containing monomers, it should be understood that the nitrogen-containing groups may be located at other positions on the hydrocarbyl radical component of the monomer, and it will be further understood that mixtures of such nitrogen-containing monomers can be employed, if desired. Also, one or more NCM can be employed in combination with one or more monomer of the formula:

$$R^1(X^1)_{n''}$$

wherein $R^1$ is as defined above, $n''$ is an integer of at least 1 (e.g., 1-4, preferably 1-2) and $X^1$ is selected from the group consisting of —$CO_2H$, —OH, —$C(O)R^1$, —SH, and —$CN(R^1)_2$ wherein $R^1$ is as defined above.

The nitrogen-containing monomers useful in this invention may be prepared by conventional methods and detailed description of such NCM preparations is not needed for a complete understanding of this invention. For example, 5-norbornene-2-methyl amine can be formed by condensation of alkyl amine and cyclopentadiene as described by K. Alder and E. Windemuth, Ber. 71, 1939 (1938).

Masking Agent

Agents which have been found to be effective in masking nitrogen-containing monomers for purposes of the present invention include metal alkyls and metal alkyl hydrides and comprise at least one organometallic compound selected from the group consisting of compounds of the formula:

$$(Halo)_{r1}M(Y)_{r2}$$

wherein M is a member selected from Group IIA, IB, IIB, IIIA, IVA, and the transition metals and elements, $r_1$ and $r_2$ are the same or different, are each integers of from 0 to 4 and are selected so as to satisfy the valence for metal M, "Halo" is Cl, Br or I, and Y is at least one of $R^2$, $R^3$, $R^4$ and $R^5$ wherein $R^2$-$R^5$ are (preferably independently) selected from the group consisting of hydrogen and $C_1$-$C_{16}$ hydrocarbyl and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$ to $C_{16}$ aryloxy, provided that at least one of $R^2$-$R^5$ is not hydrogen. Exemplary of preferred $R^2$-$R^5$ groups are members selected from the group consisting of hydrogen, methyl, ethyl, propyl, isopropyl, n-butyl, isobutyl, tertiary butyl, pentyl, hexyl, phenyl tolyl, ethylphenyl, naphthyl, methoxy, ethoxy, propoxy, hexoxy, pentoxy, phenoxy, methylphenoxy, iso-butoxy and tertiary butoxy. Illustrative of M are elements comprising at least one member selected from the group consisting of Be, Mg, Ca, Sr, Ba, La, Ti, Zr, Hf, V, Nb, Ta, Cr, Mo, W, Mn, Re, Cu, Zn, Cd, Hg, Al, Ga, Sn and Pb. Preferred are members selected from the group consisting of Mg, Ca, Ti, Zr, Cu, Zn, Cd, Hg, Al, Ga, Sn and Pb. Most preferred is Al. Preferably, when $r_1$ is 1 or greater, Halo is Cl. Most preferably, the masking agent is a non-halogenated compound of the above formula wherein $r_1$ is zero, and wherein $r_2$ is an integer of from 1 to 4. Suitable organometallic compounds are diethylzinc, and di-n-hexylmagnesium, triethyl aluminum, triisobutyl aluminum, diisobutyl aluminum hydride, tributyl aluminum, tripentyl aluminum, trioctylaluminum, diethyl aluminum hydride, dibutyl aluminum hydride, dihexyl aluminum hydride, trimethyl aluminum, trihexyl aluminum, tridecyl aluminum, tridodecyl aluminum, trihexadecyl aluminum, decyl aluminum dihydride, isobutyl aluminum dihydride, ethyl aluminum dihydride, didecyl magnesium, dipropyl zinc, propyl zinc hydride, diethoxy aluminum hydride, trimethoxy aluminum, sodium alkyls (e.g., $NaCH_3$, $NaC_3H_7$), methyl magnesium hydride, di(isopropyl) magnesium, di(n-hexyl) calcium, dimethyl [bis(cyclopentadienyl)] titanium, with triisobutylaluminum, triethylaluminum, and diisobutyl aluminum hydride being most preferred. Although the masking effect using zinc and magnesium compounds is acceptable for purposes of the present invention, it has been observed that masking with aluminum compounds is more effective in controlling catalyst poisoning. Accordingly, organoaluminum compounds are preferred over organomagnesium compounds which in turn are more preferable than organozinc compounds.

Masked Functional Group-Containing Monomer

The term masked, nitrogen-containing monomer (MNCM) as used in the specification and claims, is intended to refer to the reaction products formed by the reaction of the nitrogen-containing monomer and a masking agent comprising at least one metallic organic compound (which preferably comprises a non-halogenated metallic organic compound). The masked, nitrogen-containing monomer so formed is used as the actual comonomer in the polymerization process.

The preferred non-halogenated masked nitrogen-containing monomers useful for purposes of the present invention include those having the general formula:

$$R^1(X(M-Y)_{n'})_n$$

wherein $n'$ is an integer of from 1 to 2, n is an integer of at least 1, preferably 1-4, and more preferably from 1 to 2; $R^1$ is a member selected from the group consisting of ethylenically unsaturated hydrocarbyl radicals as defined above; X is a member selected from the group consisting of amino, cyano and imino moieties as defined above: M is a member selected from Group IIA, IB, IIB, IIIA, IVA, and transition metal elements; and Y is at least one of $R^2$, $R^3$, $R^4$ and $R^5$, wherein $R^2$-$R^5$ are independently selected from the group consisting of hydrogen, $C_1$-$C_{16}$ hydrocarbyl, and $C_1$-$C_{16}$ hydrocarbyloxy, which may or may not contain unsaturation, including $C_1$-$C_{16}$ alkyl, $C_6$-$C_{16}$ aryl, $C_1$-$C_{16}$ alkoxy, and $C_6$-$C_{16}$ aryloxy, which preferably are members independently selected from the group of hydrogen, methyl, ethyl, diethyl, propyl, isopropyl, butyl, tertiary butyl, pentyl, hexyl, phenyl, tolyl, ethylphenyl, naphthyl, methoxy, ethoxy, propoxy, hexoxy, pentoxy, phenoxy, methylphenoxy, iso-butoxy, and tertiary butoxy. Preferably, M is a metal element selected from the group consisting of aluminum; magnesium and zinc.

Masking Step

The reactive functionality of the NCM's (that is, the X groups discussed above) are preferably protected, i.e. "masked", prior to introducing these monomers into the polymerization reactor to form the amino-substituted interpolymer (C). Otherwise, an unmasked functionality would tend to react almost immediately with the Ziegler-Natta polymerization catalyst, thereby leading to a loss of activity. The masking reaction provides a chemical deactivation of the reactivity of the functionalized monomer. This deactivation is believed to be both electronic and steric. Although not wishing to be bound by any particular theory, it is believed that deactivation may also involve the temporary replacement of highly reactive groups, such as acidic protons.

The organometallic masking agents are believed to react in one of two possible ways with the nitrogen-containing to form the masked, nitrogen-containing monomer. These pathways include the following representative, but not exclusive examples.

| NCM Functionality | M(Y)$_r$ | MNCM Functionality |
|---|---|---|
| | Pathway 1 | |
| —CH$_2$NH$_2$ | (iBu)$_3$Al | —CH$_2$NH—(Al(iBu)$_2$) |
| | Pathway 2 | |
| —C=NH<br>|<br>H | H Al(iBu)$_2$ | —CH$_2$—NH—(Al(iBu)$_2$) |
| | Pathway 3 | |
| —C≡N | H Al(iBu)$_2$ | —CH$_2$—N$\diagup^{\text{Al(iBu)}_2}_{\diagdown\text{Al(iBu)}_2}$ | wherein "Bu" is n-butyl, "iBu" is iso-butyl, and "Me" is methyl.

The reaction by Pathway 1 is fundamentally the replacement of an active hydrogen of the NCM functionality by a diakyl aluminum substituent. The reaction is accompanied by loss of a mole of alkane, which in this case is isobutane. The reaction of Pathways 2 and 3 is the addition of the elements of the Al—H bond of M—(Y)$_r$ across a polarized heteroatom-carbon double bond (that is, the >C=N, or >C≡N bond) of the NCM functionality. In both cases, the final MNCM functionality is for all intents and purposes the same, i.e., a masked functionality of imino, amino, or cyano. The reaction of R$^1$(X)$_n$ and M(Y)$_r$ by either of the pathways indicated above forms masked imino, amino, and cyano functional group-containing monomers having the general formula:

$$R^1(X(M-Y)_{n'})_n$$

wherein R$^1$, X, M, Y, n' and n are as previously defined herein. The organometallic masking agent and NCM are preferably used in the method of the present invention in a masking agent: NCM molar ratio of 0.6–2.0:1, and most preferably in a molar ratio of about 1:1, for values of n=1. Larger integral values of n imply corresponding factor increases in the NCM to masking agent molar ratios charged to the masking reaction. For example, when the NCM comprises R$^1$(NH$_2$)$_2$, the masking agent is most preferably used in a molar ratio of 2 moles of masking agent per mole of such di-functional group substituted NCM. Therefore, the masking agent and NCM are preferably contacted in an amount sufficient to provide from about 0.3 to 3, more preferably from about 0.6 to 2, and most preferably from about 0.8 to 1.5 (e.g., from about 0.95 to 1.05) moles of the masking agent per reactive nitrogen equivalent of the NCM. As used herein, the "reactive nitrogen equivalents" of the NCM refers to the moles of the NCM multiplied by the sum of (a) the number of N-bonded H atoms in amino "X" group(s) in the NCM and (b) the number of cyano "X" group(s) in the NCM. For example, if a given NCM contains two secondary amino groups (or one primary amino group) per molecule, 1 mole of such a NCM contains 2 reactive nitrogen equivalents. Similarly, if a given NCM contains two primary amino groups per molecule, 1 mole of such a NCM contains 4 reactive nitrogen equivalents.

The masking reaction, which can be performed in a batchwise, continuous or semi-continuous manner, is preferably carried out by adding the NCM to the selected metal alkyl masking agent, preferably in the presence of an inert solvent or diluent. It has been observed that the desired MNCM are not formed in acceptable yields when the reverse order of addition is used, that is, when the metal alkyl masking agent is introduced into the selected NCM; rather, such a reverse order of addition tends to form a highly viscous, sludge in the masking reactor. This sludge-like material is believed to be a result of prepolymerization of the NCM by liberation of more than one Y—H (e.g. alkane) derived from a Y group on each metal alkyl per functional group masked, due to the substantial excess of the NCM over the metal alkyl in the masking reaction zone. The masking agent and NCM should be contacted under conditions and for a time effective to form the corresponding MNCM without substantial degradation of the NCM. As used herein, the term "degradation of the NCM" is intended to include side-reactions of the NCM and any component of the masking reaction mixture, such as NCM alkylation, rearrangement and prepolymerization, which decrease the yield of MNCM obtained in contacting the selected NCM and masking agent. Preferably, the selected NCM and masking agent should be contacted at a temperature and for a time sufficient to form the MNCM in essentially quantitative yields, that is, in yields of the MNCM of at least about 95%, more preferably at least about 97%, and most preferably at least about 99%, based on the NCM fed to the masking reactor. The masking reaction should be performed in a reaction zone cooled to maintain the reactants at a temperature of less than 60° C. (e.g., less than about 50° C., generally less than about 30° C., more generally from about −70° C. to +30° C., e.g. from about −20° C. to +20° C., and most preferably from about −15° C. to +10° C. It has been found that temperatures in excess of about +60° C. results in substantial degradation of the NCM even in the presence of the masking agents. The pressure employed in the masking reactor is not critical, and any convenient pressure can be employed, e.g., from about 0.05 to 20,000 kPa. Generally, the NCM and masking agent will be contacted for the masking reaction for a time of from about 0.001 to 10 hours, preferably from about 0.2 to 3 hours.

The masking reaction should be conducted in the substantial absence of molecular oxygen and water, to avoid the deleterious effects which O$_2$ and H$_2$O have upon the metal alkyl and the MNCM thus formed. Preferably, the masking reaction mixture (and the NCM, masking agent and solvent charged thereto) will contain <20 ppm H$_2$O, more preferably <10 ppm H$_2$O, and preferably <20 ppm O$_2$, more preferably <10 ppm O$_2$, by weight of the total reaction mixture. Most preferably, the masking reaction mixture (and hence the materials charged thereto) will contain <5 ppm O$_2$, and <5 ppm H$_2$O (by weight of the total reaction mixture). Preferably, reactive halides will also be substantially absent in the reactor, e.g., <10 ppm by weight reactive halide (expressed as the halide, e.g., Cl), based on the weight of the total reaction mixture. As used herein, the term "reactive halide" is intended to refer to free halogen (e.g., Cl$_2$), metal halides (e.g., dialkyl aluminum chloride, boron trichloride, tin tetrachloride and the like) or halogen-containing compounds (e.g., t-butyl chloride and the like) that will form metal halide under conditions of the masking reaction. Preferably the MNCM formed by the masking process of this invention are substantially free of halide, and contain less than about 0.01 wt %, more preferably less than about 10 ppm by weight, of total halide.

In the event the selected NCM was prepared by a process wherein $H_2O$ is formed as a by-product (e.g., as in the formation of 5-norbornene-2-carboxy (N-n-butyl) imine, as described above), or is otherwise present, the NCM should be treated to remove $H_2O$ to a level of $<20$ ppm, preferably $<10$ ppm, more preferably $<5$ ppm $H_2O$ (based on the weight of the NCM). Such water removal can be accomplished by a variety of methods, such as by cooling the NCM to a temperature sufficient (e.g., $<0°$ C.) to freeze the water out of the liquid NCM. Alternatively, the NCM liquid can be contacted with an amount of molecular sieve (e.g. 3 Angstrom mol sieve) and for a time and under conditions sufficient to remove the desired amount of water. While the precise amount of mol. sieve will vary depending on its water absorption capacity, the amount of water to be removed and other factors, generally a contact time of from 1 min. to 1 hour at temperatures of 0° to $+50°$ C., employing from 1 to 500 gms. of NCM per gram of 3 Angstrom molecular sieve will be sufficient to decrease the $H_2O$ level to $<20$ ppm for a NCM liquid containing about 10 wt % $H_2O$. The NCM feed can also be treated for water removal by the addition of water soluble inorganic salts (such as NaCl, $CaCl_2$, and the like) to form two liquid phases: the lower phase containing the salts and water; and the upper phase containing the dehydrated NCM, which can then be recovered by conventional liquid-liquid phase separation techniques.

The masking reaction may be conveniently carried out under an inert gas (such as $N_2$, Ar, He), to exclude the presence of air in the masking reaction zone.

Any solvent useful for the polymerization of the MNCM and the PCM (as discussed below) can be employed in the masking reaction. For example, suitable solvents include hydrocarbon solvents such as aliphatics, cycloaliphatics, and aromatic hydrocarbon solvents, or halogenated versions of such solvents. Preferred are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Examples of such solvents are hexane, butane, pentane, heptane, cyclopentane, cyclohexane, cycloheptane, methyl cyclopentane, methyl cyclohexane, isooctane, benzene, toluene, xylene, chloroform, chlorobenzene, tetrachloroethylene, dichloroethane and trichloroethane.

The concentrations of the NCM and masking agent in the selected reaction solvent or diluent are not critical and will typically be selected to facilitate ease of handling of the reactants and reaction mixture and the cooling thereof to remove, and control, the heat of reaction. Typically, the NCM will be employed in a concentration of from about 2 to 70 wt %, and the masking agent in an amount of from about 1 to 40 wt %, based on the total reaction mixture.

It will generally not be necessary to remove any unreacted masking agent from the NCM-masking reaction zone, nor to remove any by-product Y-H from this reaction zone.

The product mixture produced in the masking reaction, containing the MNCM, desirably should be maintained at a temperature of less than 60° C., (e.g., less than about 50° C.), preferably less than about $+30°$ C., preferably from about $-70°$ C. to $+30°$ C., and more preferably from about $-20°$ C. to $+20°$ C., until the MNCM is contacted for polymerization with the polymer chain monomer in the polymerization reaction zone, as will be described in more detail below.

As indicated above, the MNCM formed will have one or two —M—Y groups per functionality, and the value of n′ will depend on the functionality to be masked and the masking agent employed. For example, cyano functionalities will require two —M—Y groups per cyano group when M is a trivalent, divalent or monovalent metal or element as described above. Preferably, the MNCM comprises a complex of the formula:

wherein $R^1$, X, M, Y, n′ and n are as defined above.

The masking reactions of this invention can be illustrated in the following reaction equations:

---

Masking Reactions for Amine Groups

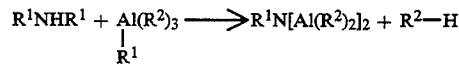

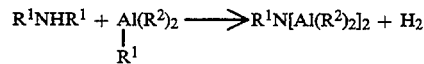

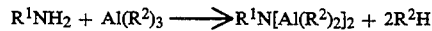

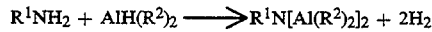

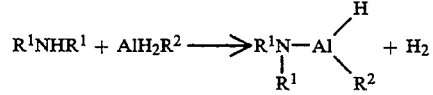

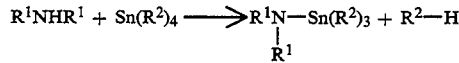

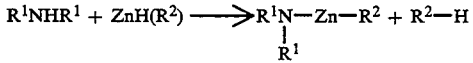

Masking Reactions for Cyano Groups

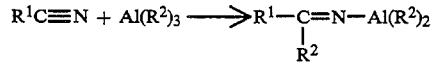

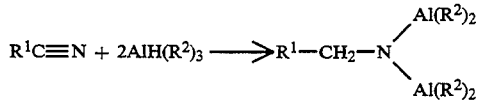

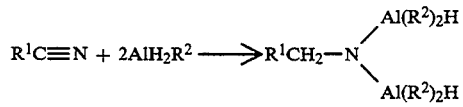

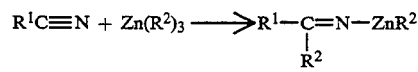

-continued

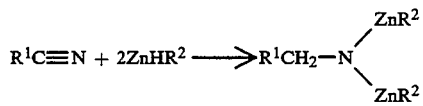

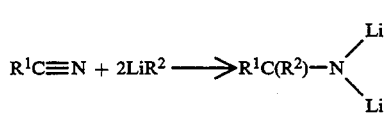

Masking Reactions for Imino Groups

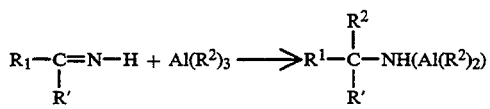

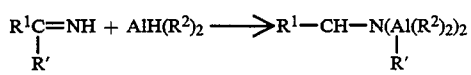

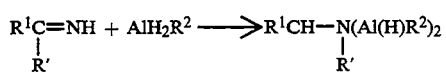

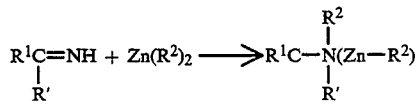

Therefore, when NCMs of the formula:

$$R^1(X^a)_n$$

wherein $R^1$ and n are as defined above, and $X^a$ is a functional group having an acidic hydrogen (e.g., —NHR′, wherein R′ is as defined above), are masked by masking agents of the formula:

$$(H)_{r'}M'(hydrocarb.)_{r''}$$

wherein each "hydrocarb." group can be the same or different and comprises $C_1$–$C_{16}$ hydrocarbyl (as defined above for $R^2$ to $R^5$), M′ is divalent, trivalent or tetravalent M (wherein M is as defined earlier), r′ is an integer of from 0 to (v-1), and r″ is an integer of from 1 to v, wherein r′+r″=v, wherein "v" is a number of from 2 to 4 and is the valence of M′ in said masking agent, the MNCM obtained comprises members selected from the group consisting of monomers of the formula:

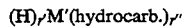 (i)

when $R^1$ is hydrocarbyl, and (ii) $R^1N(M'(Y'')_{v-1})_2$ wherein $R^1$, M′, and v are as defined above, and wherein Y″ comprises at least one of $R^2$, $R^3$ and $R^4$, wherein $R^2$–$R^4$ are the same or different and are H or $C_1$–$C_{16}$ hydrocarbyl, with the proviso that at least one of $R^2$, $R^3$ and $R^4$ is hydrocarbyl.

Further, when the NCM comprises a monomer of the formula:

$$R^1(C\equiv N)_n$$

wherein $R^1$ and n are as defined above, and the masking agent comprises metal compounds of the formula:

$$(H)_{r'}M''(hydrocarb.)_{r''}$$

wherein M″ is divalent or trivalent M (wherein M is as defined above), "hydrocarb." is as defined above, r′ is an integer from 0 to (v′−1), r″ is an integer of from 1 to v′, and the sum of r′+r″=v′, wherein v′ is 2 or 3 and is the valence of M″ in the masking agent, the MNCM obtained comprise monomers of the general formulae:

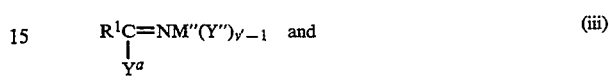 (iii)

 (iv)

wherein $R^1$, M″ and v′ are as defined above, $y^a$ is $C_1$–$C_{16}$ hydrocarbyl, and Y″ is $R^2$, $R^3$ or R4, wherein $R^2$–$R^4$ are the same or different and are H or $C_1$–$C_{16}$ hydrocarbyl, with the proviso that at least one of $R^2$–$R^4$ is hydrocarbyl. Generally, MNCM of formula (iii) are obtained when r′ is zero and MNCM of formula (iv) are obtained when r′ is greater than zero.

When the NCM monomer comprises a cyano-monomer of the formula $R^1(C\equiv N)_n$, and when these NCMs are masked with metal compounds of the formula:

$$(H)_{r'}M'''(hydrocarb.)_{r''}$$

wherein M‴ is tetravalent M, "hydrocarb." is as defined above, and r′ is an integer of from 0 to 3, r″ is an integer of from 1 to 4, wherein the sum of r′ and r″ is 4, the MNCM can comprise monomers of the formulae:

 (v)

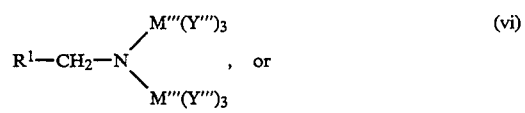 (vi)

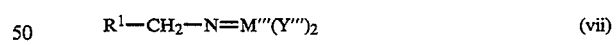 (vii)

wherein $R^1$, $y^a$, and M‴ are as defined above, and Y‴ is $C_1$–$C_{16}$ hydrocarbyl, MNCMs of formula (v) are obtained by use of m‴(hydrocarbyl)$_4$, i.e. when r′ is zero. When r′ is 1, the MNCM is of formula (vi). When r′ is 2 or 3, the MNCM is of formula (vii).

To further illustrate the above, 5-norbornene-2-carboxy (N-n-butyl) imine can be reacted with one mole of diisobutyl aluminium hydride in hydrocarbon solvent as shown below:

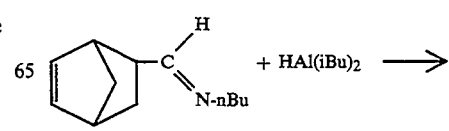

-continued

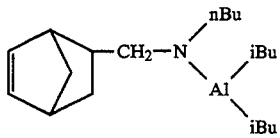

Addition of H—Al occurs across the polarized double bond of the imine leading the masked nitrogen-containing monomer, i.e., MNCM entity.

Nitrile-substituted NCMs, e.g., 5-norbornene-2-nitrile, can be masked with two moles of masking agent, e.g., i-Bu)$_2$AlH, to generate a masked amine monomer containing two atoms of M metal (e.g., aluminum) for each nitrogen, although this is not a preferred method of masking the functionality herein. The masking of a nitrile-substituted NCM can be illustrated as follows:

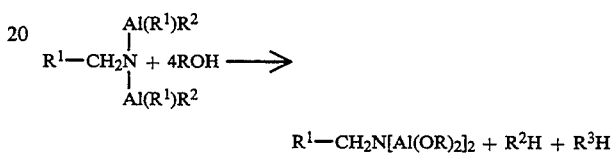

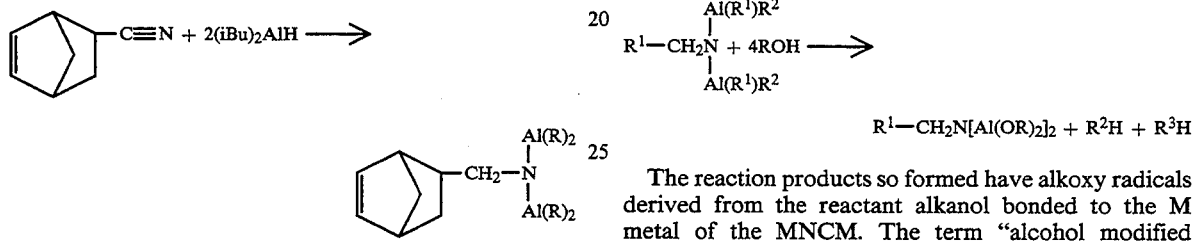

It should be noted that the mutual compatability of different masked monomers, i.e., MNCM arising from the reaction of different NCM with masking agents allow the formation and incorporation of different MNCM into the same polymer. A representative, non-exclusive, example would be to mask a mixture of 5-norbornene-2-amine and 5-norbornene-2-carboxylic acid and/or 5-norbornene-2-methanol with triisobutyl aluminum. Incorporation of this mixture in the polymerization reactor would lead to amine and carboxylic acid and/or alcohol residues on the same polymer and is a suitable procedure for incorporation of multiple functionality into the amino-substituted polymers.

As compared to the NCM having acidic hydrogens such as those bearing free acid, amine, or alcohol groups, the NCGM formed by these reactions has all potentially reactive functional sites either removed or complexed. Thus, the nitrogen atom in the imine NCM, which might otherwise interfere with catalyst performance by their lone pair donation, are effectively deactivated by chelation to the metal atom. The resultant MNCM is very stable in hydrocarbon solution (e.g., in hexane), both kinetically and thermodynamically, towards dissociation of the metal, in this particular case aluminum, from the NCM residue. Nevertheless, the masked amine group (and masked acid, alcohol, etc. functional group, if present) is very conveniently regenerated, as will be described in more detail below.

Preferably, the masking agent is non-halogenated since it has been observed that masked, nitrogen-containing monomers react in the presence of organoaluminum halides by polymerization of the norbornene double bond, leading to oligomeric, hydrocarbon-insoluble materials which are not available for incorporation into the polymer chain. Furthermore, this reaction may also involve rearrangement of the norbornene system leading to unreactive MNCMs which are unacceptable for incorporation into the polymer. Preferably, the masking is accomplished by reacting nitrogen-containing monomer with hydrocarbyl aluminum compounds wherein the hydrocarbyl moiety is a bulky group, that is, wherein the hydrocarbyl group is substituted (e.g., alkyl-substituted) preferably in the 1- or 2-carbon position, e.g., a branched $C_3$ to $C_5$ alkyl group such as isopropyl, isobutyl or t-butyl.

In another embodiment of the process of this invention, the MNCM prepared from an alkyl-substituted masking agent is reacted with a lower alkanol (e.g., a $C_2$–$C_5$ alcohol) and preferably a $C_3$–$C_4$ alkanol , e.g., isopropyl, isobutyl or t-butyl alcohol. The alcohols used are, in the order of increasing steric crowding around the carbinol carbon, methanol, ethanol (primary), isopropanol (secondary) , and t-butanol (tertiary). The reaction of a MNCM of this invention with a lower alkanol can be illustrated by the following (wherein $R^1$ is as defined above):

$$R^1-CH_2\underset{Al(R^1)R^2}{\overset{Al(R^1)R^2}{N}} + 4ROH \longrightarrow$$

$$R^1-CH_2N[Al(OR)_2]_2 + R^2H + R^3H$$

The reaction products so formed have alkoxy radicals derived from the reactant alkanol bonded to the M metal of the MNCM. The term "alcohol modified MNCM" is used herein to refer to the adducts of MNCM and alcohol prepared in accordance with this embodiment. In an illustration of this embodiment, the nitrogen-containing monomer, NBCA, is initially complexed with triisobutyl aluminum (TIBA) and the resultant hexane soluble product is further reacted with from one to two equivalents of a dry alcohol (e.g., isopropanol). The temperature and other reaction conditions employed in such alcohol modifications of MNCM can be any of those discussed above for the initial masking reaction, and preferably a temperature of from −30° C. to 0° C. is used, with from 1:1 to 2:1 molar equivalents of alcohol being used per masked functional group. It has been observed that such alcohol-modified MNCMs are soluble in hexane.

The resultant polymerizations with alcohol-modified NCM's demonstrate similar reactor performance than the results obtained for TIBA complexes alone. It has been found that further improvement in the degree of steric isolation of the masked NCM leading to an even lower degree of catalyst deactivation was obtained by different alcohols with the alcohol having the largest steric bulk, i.e., t-butanol, providing the most protection against poisoning with methanol providing the least, and the other alcohols being arranged between these limits in the order of their crowding around the amino group. Accordingly, the alcoholated masked, nitrogen-containing monomer has been found to result in higher polymerization efficiencies, higher polymer molecular weight and improved incorporation of nitrogen-containing monomer into the polymer.

Preparation of the Amino-Substituted Interpolymer

The polymerization process of the PCM and MNCM is performed in an otherwise conventional manner using suitable methods, including batchwise, semi-batch or continuous operations, conventional polymer chain monomers, and catalysts known to be effective for such polymerization. In this polymerization, the MNCM's behave like the non-polar homologues of these monomers. Especially preferred for use in the present invention are NCM-ethylene-propylene (EPM) terpolymers and NCM-ethylene-propylene-diene (EPDM) tetrapolymers. The polymerization process is preferably carried out in one or more conventional reactors, including mix-free reactor systems, continuous flow tubular reactors, and stirred-batch reactors. For purposes of illustration herein, when the process is described herein below with respect to a continuous flow stirred tank reactor, the reaction mixture is blended (i.e., back-mixed) with the incoming feed to produce a solution of essentially uniform composition everywhere in the reactor.

The monomers which are suitable as polymer chain monomers include olefin monomers such as ethylene and $C_3$-$C_{20}$ alpha olefins, and unsaturated, non-conjugated diolefins as described above. Illustrative of amino-substituted polymers useful in this invention are homopolymers, co-polymers, terpolymers, or tetrapolymers containing the above olefins and/or diolefins, in addition to the nitrogen-containing monomers. Exemplary of amino-substituted polymers produced by this invention are functionalized polypropylenes (propylene homopolymers, propylene-ethylene copolymers containing less than about 10 wt % ethylene, propylene-higher olefin copolymers containing up to about 10 wt % of higher alpha-olefins such as hexene-1, pentene-1, pentene-1, octene-1 and the like), functionalized polyethylenes (ethylene homopolymers and ethylene-propylene co-polymers containing greater than 90 wt %, usually 95 to 99 wt %, ethylene), ethylene-propylene copolymers (e.g., elastomeric EPM), ethylene-propylene-diene terpolymers (e.g., elastomer & EPDM) and the like. It is preferred, however, to perform the process in a copolymerization process of alpha-olefins and preferably a mixture of ethylene and propylene to result with an ethylene-propylene (EPM) polymer. The resultant polymer preferably contains about 20 wt % to 90 wt % ethylene and 10 wt % to 80 wt % propylene. It is also possible to include a non-conjugated diene, such as dicyclopentadiene, 1,4-hexadiene or ethylidene norbornene in the olefin mixture used in the polymerization process in order to introduce unsaturation into the backbone of the resultant polymer (EPDM).

The amino-substituted polymers may be formed by polymerizing polymer chain monomers with the MNCMs in the presence of a polymerization catalyst, wherein the polymerization catalyst includes at least one vanadium compound, zirconium compound or titanium compound, preferably wherein the vanadium compound has a valence of at least 3 (e.g., 3 to 5), and is preferably selected from the group consisting of vanadium halide, vanadium oxyhalide, and vanadium salts of beta-diketonates, with the vanadium halide preferably being vanadium tetrachloride and the vanadium oxyhalide compound having the general formula $VOX'_{n-}$'$(OR^7)_{3-n'}$ where n is an integer of 2 or 3, $R^7$ is a hydrocarbyl radical which is preferably a $C_1$-$C_{10}$ alkyl, phenyl or benzyl and more preferably $C_1$-$C_4$ alkyl (such as a member of the group of methyl, ethyl, and butyl), and X' is halogen which is preferably chlorine or bromine. The vanadium salts of beta-diketonates have the general formula of $V(0\sim0)_3$ where $0\sim0$ represents the beta-diketonate anion. The preferred beta-diketonate is 2,4-pentanedionate.

The polymerization catalyst preferably also includes an organoaluminum co-catalyst comprising organoaluminum halides and organoaluminum compounds having the formula $R^6AlX''_{(3-x)}$ wherein X'' is a halo-gen, $R^6$ is a member selected from the group consisting of alkyl and aryl (and preferably wherein.$R^6$ is a member selected from the group consisting of $C_1$-$C_{16}$ alkyl and phenyl, which is most preferably ethyl), and x is between 0 and 3, and preferably greater than 0 up to 2 (e.g., between 1 and 2), and more preferably from 1 to 1.2. Illustrative, non-limiting examples of the aluminum halide cocatalyst useful in the practice of this invention include an aluminum trichloride, ethyl aluminum dichloride, diethyl aluminum chloride and ethyl aluminum sesquichloride.

It is preferred to have the vanadium compound and the organoaluminum co-catalyst present in the polymerization catalyst in a molar ratio of vanadium to aluminum of about 1:2 to 1:30, with the molar ratio of vanadium to aluminum more preferably being about 1:5 to 1:15. The catalyst and the MNCM may be present in a molar ratio of vanadium to masked, nitrogen-containing monomers of about 1:5 to 1:100, with the molar ratio of vanadium to masked, nitrogen-containing monomers preferably being about 1:10 to 1:30. The titanium catalyst has a valence of 2 or greater and is preferably insoluble in the polymerization media. Representative, but not exclusive examples of these catalysts include $TiCl_4$, $TiCl_3$, and $TiCl_3 \cdot \frac{1}{3} AlCl_3$ (Stauffer AA Catalysts). The V and Ti catalyst can be supported on conventional catalyst supports (e.g., on silica, $MgCl_2$, zirconium, and the like). Electron donor modified versions of supported V and Ti catalytic systems can also be used.

The preferred catalysts for making elastomeric polymers include vanadium compounds, preferably having a valence of at least 3 and which are soluble in the polymerization diluent, such as $VX'_4$ and $VOX'_3$ wherein X' is halogen, i.e., vanadium halide and vanadium oxyhalide. The preferred vanadium halide is vanadium tetrachloride.

The polymerization reaction zone for polymerization of the MNCM and polar chain monomers(s) can also contain one or more of the conventional polymerization promoters, such as halogenated and non-halogenated organic polymerization promoters.

In addition to the foregoing consideration, the monomers to be selected also depends on the nature of the polymerization process and the catalyst used. The reactivity of unsaturated MNCM towards polymerization, its efficiency of incorporation into the polymer, and its distribution in the polymer is a function of the catalyst system used. Thus changes in the nature of MNCM, particularly in the type of unsaturation, are needed to accommodate the changes in polymerization catalyst.

The preferred kinds of NCM hydrocarbyl radical for some of the most common kinds of olefin polymerization for purposes of the present invention are:

| Catalysis | NCM Hydrocarbyl Radical | Polymer Type |
|---|---|---|
| a. Homogeneous Ziegler Polymerization with Vanadium Catalysts | 5-Norbornene functionalized at C-2 and/or C-7. | Rubbery EP |
| b. Heterogeneous Ziegler Polymerization with Titanium Catalysts | Acyclic alpha-olefin functionalized at C-3 | Crystalline PE, PP |

The difference between the requirements for heterogeneous and homogeneous Ziegler catalysts is primarily due to the much lower reactivity of the norbornene based monomers towards the heterogeneous catalysts.

For example, while the incorporation of norbornene based monomers is about 50 to 90% for the vanadium catalysts, it is usually less than about 30% for the titanium catalysts. Accordingly, the polymerization process is preferably a homogeneous Ziegler polymerization because of a higher incorporation of the monomer, and where the MNCM is a norbornene carrier, it is incorporated at about 50 to 90% with vanadium catalyst and at less than 30% with titanium catalyst. The process is, therefore, often described herein with respect to homogenous polymerization using vanadium catalyst.

The polymerization reaction can be carried out at any temperature suitable for Ziegler catalysis such as a temperature of about −20° C. to about 150° C., or preferably about 0° C. to about 100° C. and more preferably about 15° C. to about 60° C. The pressure used in the polymerization process can vary from about 0 Kpa to about 3000 Kpa and preferably from about 20 Kpa to about 1500 Kpa; more preferably about 100 Kpa to about 1000 Kpa and 250 Kpa to 100 Kpa, most preferably about 300 Kpa to about 600 Kpa.

Preferably, the MNCM is not be premixed with any halogen-containing component of the polymerization catalyst (e.g. vanadium halide or organoaluminum halide) and left to stand for any appreciable period of time since the halide-containing catalyst components have a tendency to react with the MNCM in which case the metal-bound hydrocarbyl groups of the MNCM will be displaced by halogen. The consequence will be MNCM degradation, including polymerization/rearrangement reactions similar to those encountered when the MNCM is reacted with an organoaluminum halide masking agent as described above. It has been observed that the polymerization results with a greater efficiency of incorporation of the MNCM to yield a higher molecular weight polymer, and with decreased incorporation of halogen into the resultant polymer.

Preferably, the MNCM is added to the polymerization reaction zone separately from the polymerization catalyst components, so as to first contact the polymerization catalyst in the presence of the polymer chain monomer(s), preferably under polymerization conditions.

Any known diluent or solvent for the reaction mixture that is effective for the purpose can be used in conducting polymerization of the PCM and the MNCM to form the masked functionalized (amino-substituted) polymer. For example, suitable diluents or solvents would be hydrocarbon solvents such as aliphatics, cycloaliphatics, and aromatic hydrocarbon solvents, or halogenated versions of such solvents. The preferred solvents are $C_{12}$ or lower straight-chain or branched-chain, saturated hydrocarbons, and $C_5$ to $C_9$ saturated alicyclic or aromatic hydrocarbons, or $C_2$ to $C_6$ halogenated hydrocarbons. Most preferred are $C_{12}$ or lower straight-chain or branched-chain hydrocarbons particularly hexane. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The polymerizations can be carried out in the presence of a molecular weight regulator to produce an amino-substituted polymer having any particular desired molecular weight. A molecular weight regulator commonly used in this type of process is, for example, hydrogen. The amount of molecular weight regulator to be used can easily be chosen based on principles well-known to those skilled in the art, depending upon the desired molecular weight of the amino-substituted polymer.

Hydrogen can be introduced to the polymerization zone to moderate polymer molecular weight. The hydrogen will be generally added in an amount of from about 0 to about 30 mole percent, based on the total monomer (MNCM+PCM).

After polymerization, the polymerization is quenched at the exit of the reactor. This quenching can be accomplished by the introduction into the polymerization reaction mixture (e.g., in the reactor or into polymerization product effluent stream) of water, lower alkanol, or aqueous acid (e.g. aqueous HCl) as quench liquid, generally using from 1 to 30 moles of quench liquid per mole of total V and Al in the reaction mixture.

The desired amino functional group, i.e., X, incorporated into the amino-substituted interpolymer as the masked functional group, can be regenerated by removal of the masking metal, M, through use of conventional de-ashing techniques, wherein the quenched polymerization product, containing masked-functionalized polymer, the polymerization catalysts, and unreacted monomers, is contacted with an aqueous liquid, e.g., water, aqueous solutions containing mineral acids (e.g., HCl, HBr, $HNO_3$, $H_2SO_4$, $H_3PO_4$, and the like), aqueous solutions containing mineral bases (e.g., caustic ammonia, sodium methoxide and the like) or mixtures thereof. The resulting hydrolysis reactions (hereinafter referred to as "de-ashing") liberate the metal masking agent and generates the amino functional group, thereby forming an amino-substituted polymer. Such hydrolysis reactions can be illustrated as follows:

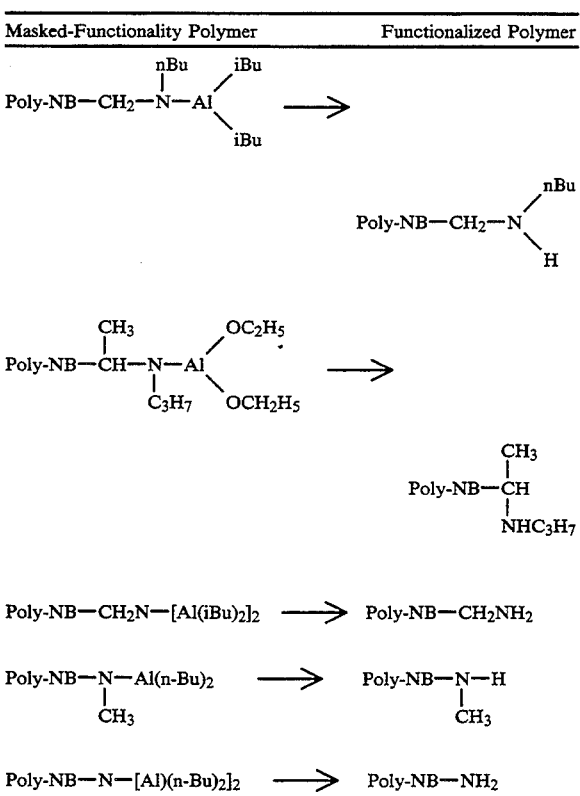

-continued

| Masked-Functionality Polymer | Functionalized Polymer |
|---|---|
| Poly-NB—N—[Al)(i-Pr)$_2$H]$_2$ ⟶ | Poly-NB—CH$_2$NH$_2$ |

$$\text{"Poly-NB—"} = \text{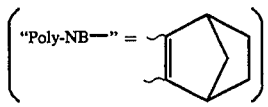}$$

De-ashing to regenerate the amino group can be conveniently accomplished by contacting the quenched polymerization product with from 0.3 to 3 volumes of water per volume of polymerization reactor effluent (in equivalent units); the water may optionally contain from 1 to 30 wt % (e.g., 3 to 10 wt %) of mineral acid(s). The mixture is contacted for a time and under conditions sufficient to de-ash the polymer and to regenerate the amino group. Generally, the contacting will be conducted for a time of from about 3 to 30 minutes, and a temperature of from about 0° C. to 85° C., with vigorous stirring. The use of an acidic aqueous liquid may be followed by one or more water washes of the separated polymer to remove residual amounts of the mineral acid. The 2-phase liquids resulting in the above steps will permit recovery of a polymer-containing upper liquid phase comprising the functionalized polymer and polymerization solvent or diluent, and an aqueous lower liquid phase containing the mineral acid, and aqueous soluble salts of the catalyst and masking agent metal(s). The aqueous layer will preferably also contain unreacted NCM, due to the water solubility of the NCM attributed by the hydrophilic nature of the "X" functionality.

The polymer may be recovered from the upper phase by flash evaporation followed by drying to remove residual water. The flashing technique can involve the addition of the quenched polymerization product to a tank of hot water (50° C. to 100° C.) sprayed with steam to strip off the solvent and unreacted monomers. The polymer may be then dried by evaporation of water, generally at temperatures of from about 150° C. to 200° C., e.g., on a hot rubber mill.

It will be understood that any cyano groups of the NCM will, upon masking, polymerization and regeneration, be regenerated as an amino group, rather than a cyano. The amino group may be either primary or secondary, and is determined by the number of carbon radicals attached to the nitrogen in the masked monomer. A single carbon radical leads to primary amine while two alkyl groups lead to a secondary amine.

The NCM is present in the resultant amino functionalized polymer in an amount of from about 0.01 to about 40 wt %, by total weight of the amino functionalized polymer preferably in an amount of from about 0.1 to about 20 wt %, more preferably in an amount of from about 0.75 to about 10 wt %, and most preferably in an amount of from about 1.0 to about 7 wt %. The preferred amino-substituted ethylene-propylene copolymers employed in this invention will, therefore, comprise from about 20 to 90 wt % ethylene, from about 10–80 wt % propylene, and from about 0.01 to 40 wt % nitrogen-containing monomer, more preferably from about 0.1 to 20 wt %, still more preferably from about 0.75 to 10 wt %, and most preferably from about 1 to 7 wt %, nitrogen-containing monomer. The preferred amino-substituted ethylene-propylene-diene terpolymers employed in this invention will therefore comprise from about 20–90 wt % ethylene, from about 10–80 wt % propylene, from about 0.5 to 15 wt % (and more preferably from about 1 to 10 wt %) non-conjugated diene, and from about 0.01 to 40 wt %, more preferably from about 0.1 to 20 wt %, still more preferably from about 0.75 to 10 wt %, and most preferably from about 1 to 7 wt %, nitrogen-containing monomer.

The amino-substituted polymers employed in this invention are oil soluble and have a number average molecular weight ($\overline{M}_n$) of from about 500 to 500,000. The amino-substituted polymers with $\overline{M}_n$ of from 500 to 10,000, are preferred for use in preparing the dispersant additives of this invention for use in oleaginous compositions (more preferably $\overline{M}_n$ of from 800 to 5,000). The amino-substituted polymers, when intended for use in preparing the viscosity index improver dispersants of the present invention, preferably will have $\overline{M}_n$ of from greater than 10,000 to 200,000 or more, and more preferably from 20,000 to 150,000. For electronic applications, the $\overline{M}_n$ of the amino-substituted polymer will preferably be from 500 to 200,000, and more preferably from 700 to 150,000.

Preferably, the amino-substituted polymer will have within its structure, on average, at least 0.5 (e.g., from 0.5 to 20), and preferably at least 1 (e.g., from 1 to 15) pendent reactive amine groups (i.e., primary and/or secondary amine groups) per polymer molecule.

The amino-substituted polymer will preferably also have a molecular weight distribution ($\overline{M}_w/\overline{M}_n$) of from about 1.0 to 20, and more preferably of from about 1.5 to 15.

Preferably, the amino-substituted polymers have a substantially homogeneous distribution of amino functionality between the polymer chains, that is, the wt. % concentration of amino functionality is substantially uniform for chains of all molecular weights. Furthermore, the polymers preferably cannot be separated into two or more significant fractions (e.g., >5 wt % of total polymer) which have different compositions arising from different levels of incorporation of NCM and PCM. The "level of functionality" as used herein is defined to be equivalents of amino functionality per unit weight of the amino-substituted polymer, and is commonly expressed for these polymers in milliequivalents of functionality per 100 gms of amino-substituted polymer.

The distribution of functionality in a polymer can be readily determined by methods known in the art. One technique is to tag a random fraction of the functionality with a UV-visible chromophore. The tagging is done by a specific chemical reaction (e.g., amidation) on the functionality of choice with a reagent carrying the UV-visible chromophore tag. The tagging reaction is chosen to be one where the tagged functionality will exist in that state through the subsequent investigations. The chromophore found to be particularly suitable for this purpose is the phenyl ring and procedures for derivatizing amino functionalities with suitable phenyl group containing agents are well known in the art. The derivatized polymer is analyzed by a gel permeation chromotographic procedure and the effluent is analyzed by two detectors, i.e., one for the quantity of the polymer and the other sensitive to the concentration of the chromophore. The uniformity of functionality distribution in the original polymer is observed by coincident responses of the two above mentioned detectors.

Also, the amino-substituted polymers have a low total halogen content and are essentially devoid of any organic halide. Preferably, the amino-substituted polymers contain less than 0.10 wt %, and preferably less than 0.03 wt %, of total organic chlorine, with an organic chloride content measured by the absorbance of 1/100 inch thick film of the polymer at 610 cm$^{-1}$ of less than 0.05, and preferably 0.03, absorbance units.

Analytic Methodology Used in Examples 1-5

The polymerization rate was determined by weighing the amount of rubber obtained in a fixed time period. Monomer conversion and catalyst efficiency (weight of polymer products/wt. vanadium catalyst feed) were determined to characterize the catalyst activity. Infrared analysis (ASTM D3900) was used to measure polymer ethylene content while refractive index [I. J. Gardiner & G. Ver Strate, *Rubber Chem. Tech.*, 46, 1019 (1973)] was used for ENB content. In the absence of ENB in the polymer, this was also used as a semi-quantitive measure of NCM content in the polymer. Polymer Mooney viscosity was measured by ASTM D-1646.

Molecular weight ( number-average, $\overline{M}_n$; weight-average, $\overline{M}_w$; z-average, $\overline{M}_z$) and molecular weight distribution (MWD=$\overline{M}_w/\overline{M}_n$) were measured using a Waters 150 gel permeation chromatograph equipped with a Chromatix KMX-6 on-line light scattering photometer. The system is used at 135° C. with 1,2,4-trichlorobenzene as the mobile phase. Showadex (Showa-Denko America, Inc. ) polystyrene gel columns 802, 803, 804 and 805 were used. The technique utilized is described in *Liquid Chromatography of Polymers and Related Materials III*, J. Cazes, editor, Marcel Dekker, 1981, p. 257 et seq., incorporated herein by reference. No corrections for column spreading are employed; however, data on generally accepted standards, e.g., National Bureau of Standards Polyethylene 1484 and anionically produced hydrogenated polyisoprene demonstrate that such corrections on $\overline{M}_w/\overline{M}_n$ or $\overline{M}_z/\overline{M}_w$ are less than 0.10 units. $\overline{M}_w/\overline{M}_n$ was calculated from an elution time-molecular weight relationship, whereas $\overline{M}_z/\overline{M}_w$ is evaluated using a light scattering photometer. The $\overline{M}_w/\overline{M}_n$ are used as an indication of MWD breadth (the larger the value, the broader MWD). Polymers were analyzed for amino functionality content by infra red spectroscopy.

Polymers containing amino functionality were dissolved in hexane (approx. 3 wt. % solution) and quantitatively amidated with an equal volume of acetic anhydride, according to the reaction below:

Poly-CH$_2$NH$_2$+(CH$_3$·CO)$_2$O→Poly-CH$_2$·NHCOCH$_3$+CH$_3$CO$_2$H

After refluxing for two hours, the polymer was recovered, molded in a pad of uniform thickness between 0.003 to 0.02 inch thick. The infrared spectrum of the sample contained an intense absorption at 1660 cm$^{-1}$ due to the carbonyl group. The intensity of this absorption was measured in absorbance units (A$_3$). This was correlated to the concentration of milliequivalents amino functionality expressed in milliequivalents per 100 gm of polymer (C$_{alcohol}$) by the following relationship:

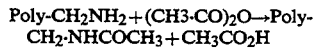

where $t_3$ is the thickness of the polymer sample expressed in thousandth of an inch.

These analytical relations were obtained by measuring the infrared extinction coefficients for the carbonyl groups and closely related monomeric model compounds in hexane media. Typically the experiment was conducted with the derived NCM and repeated to cover the span of obtainable concentrations of amino functionality. In all cases, Beer's law was found to be obeyed by the chromophore between the concentration of 0-30 meq/100 gms of amino-substituted polymer.

Polymers were analyzed for the distribution of amino functionality among the polymer chains (i.e., intermolecular amino functionality concentration distribution). The distribution of amino functionality in the polymers for purposes of tests run and comparisons made in connection with this application is measured by a chromatographic technique.

Uniformity (or "homogeneity") of amino functionality distribution is measured by observing the variation in the extinction coefficient, that is the ratio of the concentration of the chromophore to the total weight of the polymer as a function of amino functionalized polymer chain molecular weight. A polymer with a substantially uniform amino functionality distribution has this ratio substantially constant over a wide range of polymer chain molecular weights. Amino-substituted polymers employed in the present invention preferably have the above-mentioned ratio varying by from about 0 to 15%, and more preferably from about 0 to 10%, in the chain molecular weight range of 10$^3$ to 10$^9$, provided the molecular weight range is such that the polymer components contain at least 95%, and preferably 97%, of the total weight of polymer, and that at least 95%, and preferably 97%, of the total equivalents of the amino functionality are included.

Uniformity of composition was also determined by a solvent fractionation technique. In this procedure, a polymer hexane solution containing approximately 1-2 grams of amino-substituted polymer per 100 ml. of solvent was treated judiciously with isopropanol to precipitate a fraction of the amino-substituted polymer. The precipitated amino-substituted polymer was equilibrated for 30 minutes with the bulk of the solution and then removed by filtration. More fractions were obtained by further addition of aliquots of isopropanol to the filtrate until the amino-substituted polymer was almost completely precipitated. The last fraction was obtained by evaporating the filtrate to a solid residue. Typically, the amino-substituted polymer was divided into 8 or 10 fractions and these were analyzed for ethylene residue content by infrared spectroscopy and for norbornene residue content by changes in refractive index. As indicated by the test results, amino-substituted polymers employed in the present invention preferably have substantially uniform compositions of NCM, within the chain molecular weight range of 10$^3$ to 10$^9$ which amount to within 15% and more preferably within 10% of the average for the whole amino-substituted polymer. The analysis of the norbornene residue content indicated that no fraction of the amino-substituted polymer analyzed contained more than 7% and preferably 5%, of the total weight of the polymer, and that no fraction of the polymer analyzed contained 35% or more of the total amount of amino functionality in the polymer.

The amino-substituted polymers were also analyzed for halogen content. For purposes of this application, the halogen content of the polymer was determined only for chlorine residues which appear to be the largest fraction of halogen contaminates. Nevertheless, the analysis can be generalized to other applicable halogens, i.e., bromine. Chlorine was determined by elemental analysis according to instrumental techniques established in the art and organic chloride content in the polymer was determined by the intensity of the absorbance of a polymer film of standardized thickness at 610 cm$^{-1}$ in the infrared spectrum where C—Cl bonds absorbs strongly.

The following examples are presented below to illustrate the foregoing discussion for a better understanding of the invention. All parts, proportions and percentages are by weight unless otherwise indicated. Although the examples may be directed to certain embodiments of the present invention, they are not to be viewed as limiting the invention in any specific respect. In the following examples, the following abbreviations have these meanings:

EADC=ethyl aluminium dichloride
EASC=ethyl aluminium sesqui chloride
DIBAL-H=di isobutyl aluminium-hydride
NBCXA=5-norbornene-2-carboxaldehyde
PhNH$_2$=aniline
BuNH$_2$=n-butyl amine

EXAMPLE 1

In separate runs, 2.5 mmol of NBCXA dissolved in 10 ml of hexane was slowly added, with stirring, to a cold solution of 2.5 mmol of either n-butyl amine, or aniline in hexane. The addition was performed under a nitrogen atmosphere and the reaction temperature was maintained at 0° C. by external cooling. The reaction mixture was stirred for 30 minutes and to the resultant cloudy mixture was added 20 gms of 4 Angstrom dry molecular sieve. After 30 minutes of contact with agitation the clear solution of n-butyl imine or phenyl imine, respectively, of NBCXA was decanted off into a dry nitrogen filled flask. To this solution was added 2.6 ml of a 15% solution of DIBAL-H in hexane under nitrogen over a period of 30 seconds. The solution temperature was allowed to warm to ambient temperature (25° C.) and after 30 minutes a pale yellow solution of the masked amine monomer was obtained.

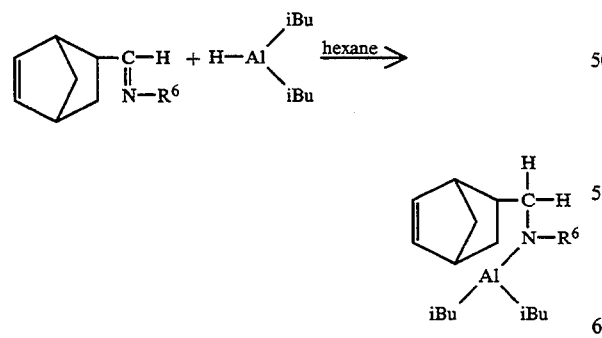

wherein R$^6$=nBu or Ph

The course of the reaction was identified by C-13 NMR the solutions. Solutions of the reaction with metal alkyls suitable for NMR analysis were prepared, and C-13 NMR of the solutions was observed as described earlier. The NMR results are shown in the Table below.

TABLE I

C-13 NMR Data for 5-Norbornene-2-Carboximine Complex with Diisobutylaluminum hydride
(Data for Principle Endo Isomer Only)

| Compound | Carbox Carbon | Olefinic Carbon | |
|---|---|---|---|
|  |  | C-5 | C-6 |
| 5-Norbornene-2-Carboxaldehyde(1) | 198(d,170) | 136.3(d,173) | 131(d,171) |
| 1 + BuNH$_2$(1:1) (2) | 164.4(d,150) | 135.9(d,168) | 131.5(d,170) |
| 1 + PhNH$_2$(1:1) (3) | 166.5(d,153) | 136.1(d,170) | 131(d,165) |
| 2 + (i-Bu)$_2$AlH(1:1) | 72(t,30) | 136(d,165) | 132(d,170) |
| 3 + (i-Bu)$_2$AlH(1:1) | 69.2(t,132) |  |  |

.All spectra in hexane solution only
.Data in ppm from TMS; numbers in parenthesis are coupling $^{13}$C-$^1$HC (d = doublet; t = triplet)

These experiments indicate that the reduction of 5-norbornene-2-carboxyimine (Products 2 or 3) with diisobutyl aluminum hydride leads to the formation of a single masked amine monomer.

EXAMPLE 2

79.0 g of 5-norbornene-2-carboxaldehyde (NBCXA), (77.6 ml, 0.647 mole) were dissolved in 500 ml of hexane. 47.3 g of n-butylamine (64 ml, 0.647 mole) was slowly added at 25° C. The solution was stirred for five minutes and cooled to $-18°$ C. for several hours. The liquid hexane layer was decanted under nitrogen to remove the precipitated water which had frozen to ice and adhered to the sides of the reaction vessel. The clean hexane solution was removed under nitrogen to a separate reactor and dried with 50 gms of dried 4A molecular sieve. After thirty minutes, the hexane layer containing the n-butyl imine of NBCXA was separated from the molecular sieves and to it was added at $-10°$ C. 80.3 gm (0.647 mole) of diisobutylaluminum hydride as a 15% solution in hexane under nitrogen. The solution was stirred under nitrogen for one hour to yield the MNCM of 5-norbornene-2-methyl-(N-n-butyl) amine. The reactions are summarized below:

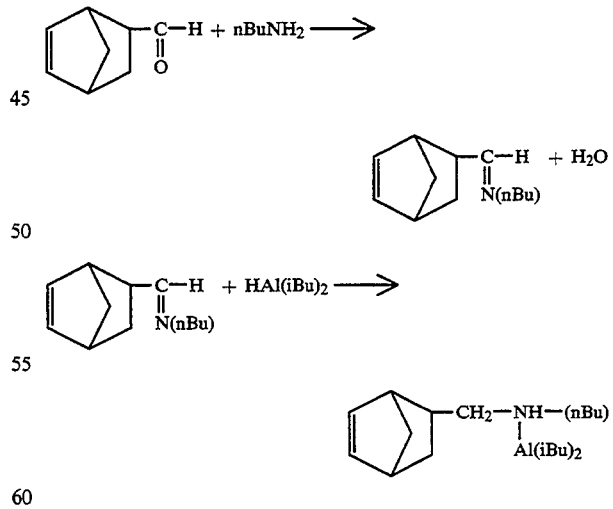

EXAMPLE 3

In this example, the MNCM obtained by reacting 5-norbornene-2-carbox-(N-n-butyl) imine with diisobutyl aluminum hydride in an equimolar ratio was introduced into an EP polymerization reactor. The object was to determine if this MNCM was acceptable for introducing secondary amine functionality in EP. The MNCM was made according to the procedures described below.

77.6 ml of 5-norbornene-2-carboxaldehyde (NBCXA) (79.0 gm) was slowly added to a solution of 64 ml of n-butylamine (47.4 gms) in 500 ml of hexane solution. The mixture was allowed to stand for 3 hours at 0° F. and separated from the precipitated water. The clear hexane solution was dried by standing over 4A° mole sieves for 2 hours and slowly added to a solution of 80.2 gm of diisobutyl aluminum hydride in 1000 ml of hexane at −30° C. under a nitrogen blanket. After 3 hours at room temperature, the resultant solution was ready for introduction into the polymerization reactor. The conditions of polymerization are shown in Table II and the results in Table III:

TABLE II

Conditions

Reactor = 3.875 liter (CFSTR)
Temperature = 27° C.
Pressure = 500 Kpa gauge
Agitation = 1200 rpm
Residence = 9 min.
Al/V Molar Ratio = 10 for catalysts compounds Feeds Hexane = 23.9 liters/hr.
Ethylene = 363 g/hr.
Propylene = 643 g/hr.
$VCl_4$ = 1.896 g/hr.
EASC = 1.22 g/hr.
EADC = 12.48 g/hr.
Hydrogen = 120 w ppm on ethylene
NCM (masked as above) = 23.40 g/hr.

TABLE III

| Polymerization Parameters | | Polymer Proportion | | |
|---|---|---|---|---|
| Rate (g/hr) | Catalyst Efficiency (g/g) | Ethylene Content (wt %) | $M_L(1 + 8)$ (100° C.) | MNCM (conv %) |
| 766 | 405 | 45.8 | 18 | 93 |

The results of this example show that the MNCM generated by the addition of diisobutyl aluminum hydride to imines is an acceptable method for incorporating amine functionality in EP.

EXAMPLE 4

In this example, amino-substituted EP polymer obtained by the procedures described in Example 3 was analyzed for distribution of functionality along the polymer chains. The object was to demonstrate that the formation of MNCM by reaction with nonhalogenated aluminum alkyls lead to a substantially uniform distribution of functionality in the polymer chain. The polymer was analyzed by (i) the gel permeation chromatography method and (ii) the solvent-nonsolvent fractionation method according to the procedures outlined earlier and described in detail below.

10.2 gms of the polymer made in Example 3, with diisobutyl aluminum hydride as the masking agent, was dissolved in 500 ml of hexane. To the clear solution was added with magnetic stirring isopropanol from a burette. After addition of approximately 35 ml of isopropanol a slight white precipitate was obtained. The rate of addition of isopropanol was slowed to ∼1 drop/minute and agitation continued until a sizeable amount of polymer was precipitated. The precipitated polymer was equilibrated with the remaining solution by slow agitation at room temperature for 30 minutes. The slurry was filtered through a weighed filter paper and the residue dried to obtain the first fraction. To the filtrate was added a further amount of isopropanol (approx. 7 ml) to precipitate the second fraction which was removed in an identical manner. Continuing this process eight fractions of approximately equal weight were obtained with the last fraction being obtained by evaporation of the filtrate of the seventh precipitation. The fractions were labelled in their order of precipitation and each aliquot was recovered, dried and analyzed according to the techniques described above by a combination of infrared spectroscopy and refractive index.

TABLE IV

| Fraction | wt (gms) | NCM Content (wt %)[1] |
|---|---|---|
| 1 | 1.2 | 1.3 |
| 2 | 1.0 | 1.4 |
| 3 | 1.4 | 1.5 |
| 4 | 1.0 | 1.4 |
| 5 | 1.3 | 1.5 |
| 6 | 1.1 | 1.3 |
| 7 | 1.7 | 1.5 |
| 8 | 1.5 | 1.3 |

Note[1]NCM content determined by refractive index, which is proportional to the actual weight percent.

The analysis of the amino-substituted polymer shows that the polymer has a substantially uniform distribution of amino functionality among the polymer chains.

EXAMPLE 5

In this example, the amino-substituted EP polymer made by the procedures set forth in Example 3 was analyzed for chlorine. Chlorine content was determined by two procedures, i.e., (i) a total chlorine content by elemental analysis, and (ii) a measure of organic chlorine by infrared spectroscopy.

5.1 gms of the polymer was dissolved in 200 ml of hexane. The solution was filtered to remove all suspended impurities. Sufficient isopropanol to precipitate all the polymer was then slowly added with stirring to the clear filtrate. The precipitated polymer was recovered by filtration, dried and analyzed by chlorine content. The amino-substituted polymer was found to contain 101 ppm Cl by elemental analysis, and to provide 0.03 absorbance at 610 cm$^{-1}$ by infrared spectroscopy (absorbance measured for a film of uniform thickness of 2/100 inch with similar film of nonfunctionalized EP as reference).

As indicated above, the amino-substituted polymer can comprise a polyolefin substituted by amino groups prepared by halogenation of a polyolefin to form a polymer substituted by halogen groups, followed by reaction of this halogenated polymer with an amine. Such processes are conventional (and are di&closed, e.g., in U.S. Pat. Nos. 3,275,554, 3,438,757, 3,565,804, and 4,000,353, the disclosures of which are hereby incorporated by reference in their entirety) where the halogen group on the halogenated polymer is displaced with the nitrogen-containing compound in the subsequent reaction therewith.

For example, a polymer of a $C_2$ to $C_5$ monoolefin, e.g., polyethylene, polypropylene or polyisobutylene, (e.g., having a $\overline{M}_n$ of greater than 10,000, such as 15,000 to 500,000 or more, generally from 20,000 to 250,000) is halogenated with either bromine or chlorine; preferably the latter. The halogen may be conveniently added as gaseous chloride, liquid bromine, or a hydrohalogen, e.g., HCl or HBr gas.

The amount of halogen introduced will depend on the particular polymer used, the desired amount of amine to be introduced into the molecule, the particular alkylene amine used, and the halogen used. The amount of halogen introduced will generally be in the range from about 1 to 5 halogen atoms per molecule, depending on the reactivity of the resulting halide. On a weight percent basis, the amount of halide will generally range from about 1 to 25, more usually from about 1 to 10.

The halogenation step may be conducted in the temperature range of from about ordinary ambient temperatures to about 120° C. To aid in the halogenation step, the polymer may be dissolved in a suitable solvent, such as carbon tetrachloride, in order to lower the viscosity of the polymer, although the use of such a solvent is not necessary.

The time required for halogenation may be varied to some extent by the rate at which the halogen is introduced. Ordinarily from about 2 to about 5 hours is a satisfactory halogenation period.

The halogenated polymer and amine compound (e.g., ammonia, alkylene polyamine or polyalkylene polyamine) may be brought together in the presence or in the absence of an inert solvent, particularly a hydrocarbon solvent. The inert hydrocarbon solvent may be aliphatic or aromatic. Also, aliphatic alcohols may be used by themselves or in combination with another solvent, when capable of dissolving the reactants.

The reaction may be carried out at room temperature (20° C.), but elevated temperatures are preferred. Usually, the temperature will be in the range of from about 100° to 225° C. Depending on the temperature of the reaction, the particular halogen used, the mole ratios and the particular amine, as well as the reactant concentrations, the time may vary from 1 to 24 hours, more usually from about 3 to 20 hours. Times greatly in excess of 24 hours do not particularly enhance the yield and may lead to undesirable degradation. It is therefore preferred to limit the reaction time to fewer than 24 hours.

The mole ratio of halogenated polymer to amine compound will generally be in the range from about 0.2 to 10 moles of amine compound per mole of halogenated polymer, more usually 0.5 to 5 moles of amine compound per mole of halogenated polymer. The mole ratio will depend upon the amount of halogen present in the halogenated polymer, the particular halogen and the desired ratio of halogenated polymer to amine compound.

After the reaction has been carried out for a sufficient length of time, the reaction mixture may be extracted with a hydrocarbon medium to free the product from any low molecular weight amine salt which has formed. The product may then be isolated by evaporation of the solvent. Further separation from unreacted hydrocarbon or purification may be carried out as desired, e.g., chromatography.

THE ALDEHYDE MATERIAL

The aldehyde reactants employed in preparing the materials of this invention will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R″CHO, wherein R″ is H, aliphatic hydrocarbon radical (e.g., having from 1 to 4 carbon atoms), or aromatic radical (e.g., having from 6 to 10 carbon atoms).

THE HETEROCYCLIC NITROGEN REACTANTS

The heterocyclic nitrogen reactants useful in present invention comprise heterocyclic compounds containing a 5- or 6-membered ring with one nitrogen hetero-atom or two or three adjacent nitrogen hetero-atoms, in which two adjacent carbon atoms of the heterocyclic ring may form part of a further 6-aromatic, heterocyclic or alicyclic ring system, wherein the heterocyclic compound contains at least 1 —N(H)— ring group. The heterocyclic compound can contain other heteroatoms, usually O or S. Preferably, the heterocyclic ring is unsaturated.

The 6 membered ring system, part of which may be formed by two adjacent carbon atoms of the heterocyclic ring, can comprise an aromatic ring system, for example, a benzene ring or naphthalene ring system. This adjacent 6-numbered aromatic ring system can also comprise a heterocyclic ring and an ethylenically unsaturated alicyclic ring system.

The heterocyclic ring and the adjacent 6-numbered ring system may be substituted or unsubstituted. (Preferably substitution in such systems occurs on carbonatoms of the ring). Suitable substituents comprise alkyl, alkaryl, aryl, aralkyl or alkenyl, such as alkyl groups of from 1–10 carbon atoms (methyl, ethyl, propyl, butyl, pentyl, decyl and the like), aryl are from 6–10 carbon atoms ( such as phenol and naphthyl), alkaryl and aralkyl are from 7–10 carbon atoms (tolyl, xylyl, ethylphenyl, and the like) and alkenyl of 2–10 carbon atoms (such as ethenyl, propenyl, butenyl, decenyl, and the like). Suitable substituents also include polar substituents, provided that the polar substituents are not present in proportions sufficiently large to alter significantly the hydrocarbon character of the hydrocarbyl group. Such polar substituents are exemplified by chloro, bromo, keto, etheral, aldehydo or nitro. The upper limit with respect to the proportion of such polar substituents on the group is about 10 wt % based on the weight of the hydrocarbyl portion of the group. Such polar substituent containing groups are referred to as hydrocarbyl groups throughout this specification.

Preferred herein are heterocyclic compounds of the formula:

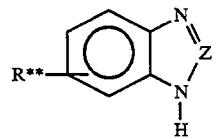

wherein Z is N, C(H) or C(R*), and R** is H, —OH, —Cl, —I or R*, wherein R* is $C_1$ to $C_{24}$ hydrocarbyl (most preferably $C_1$ to $C_3$ alkyl).

Exemplary of heterocyclic reactants useful in this invention are triazole, benzotriazole, 5-methyl benzotriazole, 5-ethyl benzotriazole, 5-butyl benzotriazole, 5-propyl benzotriazole, 5-dodecyl benzotriazole, 2-methyl benzotriazole, 2-ethyl benzotriazole, 2-butyl benzotriazole, 2-propyl benzotriazole, 2-dodecyl benzotriazole, 5,7-dimethyl benzotriazole, 5,7-diethyl benzotriazole, 5,7-dibutyl benzotriazole, 5,7-dipropyl benzotriazole, 5,7-didodecyl benzotriazole, naphthotriazole, 5-methyl naphthotriazole, 5-ethyl naphthotriazole, 5- butyl naphthotriazole, 5-propyl naphthotriazole, 5-dodecyl naphthotriazole, imidazole, 4-methyl imidazole, 4-ethyl imidazole, 4-butyl imidazole, 4-propyl imidazole, 4-dodecyl imidazole, 5-methyl imidazole, 5-ethyl imidazole, 5-butyl imidazole, 5-propyl imidazole, 5-dodecyl imidazole, benzimidazole, 5-methyl benzimidazole, 5-ethyl benz imidazole, 5-butyl benzimidazole, 5-propyl benz imidazole, 5-dodecyl benzimidazole, 2-methyl benzimidazole, 2-ethyl benzimidazole, 2-butyl benzimidazole, 2-propyl benzimidazole, 2-dodecyl benzimidazole, 5,7-dimethyl benzimidazole, 5,7-diethyl benzimidazole, 5,7-dibutyl benzimidazole, 5,7-dipropyl benzimidazole, 5,7-didodecyl benzimidazole, pyrrole, 3-methyl pyrrole, 3-ethyl pyrrole, 3-butyl pyrrole, 3-propyl pyrrole, 3-dodecyl pyrrole, 4-methyl pyrrole, 4-ethyl pyrrole, 4-butyl pyrrole, 4-propyl pyrrole, 4-dodecyl pyrrole, 5-methyl benzpyrrole, pyrazole, 5-methyl benzpyrazole, 5-ethyl benzpyrazole, 5-butyl benzpyrazole, 5-propyl benzpyrazole, 5-dodecyl benzpyrazole, 7-methyl benzpyrazole, 6-ethyl benzpyrazole, 7-butyl benzpyrazole, 6-propyl benzpyrazole, 7-dodecyl benzpyrazole, 5,7-dimethyl benzpyrazole, 5,7-diethyl benzpyrazole, 5,7-dibutyl benzpyrazole, 5,7-dipropyl benzpyrazole, 5,7-didodecyl benzpyrazole, 2-pyrroline, 3-pyrroline, 3-pyrazoline, carbazole, 5-methyl carbazole, indole, 3-methyl indole, 3-ethyl indole, 3-butyl indole, 3-propyl indole, 3-dodecyl indole, 4-methyl indole, 4-ethyl indole, 4-butyl indole, 4-propyl indole, 4-dodecyl indole, purine, phenothiazine, phenoxazine, perimidine, and the like.

Most preferred are benzotriazole and tolyltriazole.

PREPARATION OF THE MANNICH BASE DERIVATIVES

The amino-substituted polymer is reacted with the aldehyde and heterocyclic reactant in accordance with this invention by contacting in a reaction zone. The reactants are contacted for a time and under conditions effective to react the aldehyde, reactive amine groups of the amino-substituted polymer and the —NH groups of the heterocyclic nitrogen reactant to form a Mannich Base condensation product containing heterocyclic nitrogen units bound to at least a portion of the amino-substituted polymer through a hydrocarbylene group derived from the aldehyde (e.g., a methylene (—CH$_2$—) group derived from formaldehyde).

The conditions of temperature and pressure under which the reaction occurs can vary widely, and generally temperatures of from about 0° to 200° C., preferably from about 25° to 150° C. Temperatures of less than 0° C. can be used but undesirably slow reaction rates can result. Reaction temperatures of greater than 200° C., up to the decomposition point of the reactants or reaction products, can also be employed, with the attendant formation of by-products. The pressures in the reaction zone will be sufficient to maintain a liquid reaction medium, and generally pressures from about 0.1 to 1000 kPa, and preferably from about 1 to 100 kPa, will be employed.

The reaction can be carried out in a batchwise, continuous or semicontinuous manner, in one or more reaction zones. The reaction can be conducted in any conventional apparatus such as stirred tank reactors, tubular flow reactors and the like.

The reactants can be charged to the reaction zone continuously or intermittently, together or sequentially, in any order. Generally, the amino-substituted polymer and any solvent for the reaction will be first charged to the reaction zone, followed by aldehyde reactant and then by addition of the heterocyclic nitrogen reactant, which can, if desired, be introduced to the reaction zone as a mixture of the aldehyde and heterocyclic nitrogen reactants. Preferably, the amino-substituted polymer is not contacted with the heterocyclic nitrogen reactant in the absence of the aldehyde reactant at reaction conditions.

The process of the present invention can be accomplished using a wide range of ratios of reactants, and the amino-substituted polymer:aldehyde reactant:heterocyclic nitrogen reactant will generally be charged in a ratio of from 1:0.1:0.1 to 1:50:50, preferably from 1:0.2:0.2 to 1:10:10, and more preferably from 1:0.5:0.5 to 1:5:5, molar equivalents of amino-substituted polymer:moles of aldehyde reactant:moles of heterocyclic nitrogen reactant.

The reaction can be conducted in the absence, or in the presence, of a diluent or solvent for the amino-substituted polymer. Suitable solvents include mineral and synthetic lubricating oils, and hydrocarbon solvents such as aliphatics, cycloaliphatics, and aromatic hydrocarbon solvents, or halogenated versions of such solvents. The preferred solvents are C$_{12}$ or lower straight-chain or branched-chain, saturated hydrocarbons, and C$_5$ to C$_9$ saturated alicyclic or aromatic hydrocarbons, or C$_2$ to C$_6$ halogenated hydrocarbons. Non-limiting illustrative examples of diluents or solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The reaction time can vary widely, and will depend on such factors as the amount of reactants employed, the size of the reaction vessel, the temperature and other factors. Generally, the reaction time will range from about 0.5 to 48 hours, and more typically from 2 to 12 hours.

The heterocyclic nitrogen reactants are attached to one or more of the nitrogen atoms of the amino-substituted polymer through the residue of the aldehyde employed, e.g., —CH$_2$— in the case of formaldehyde. For the amino-substituted interpolymers employed in this invention, this can be illustrated as follows:

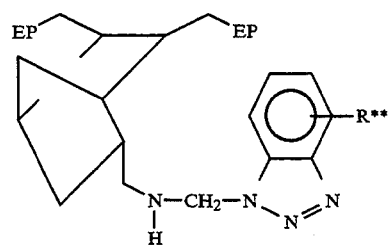

wherein EP represents the balance of the polymer, and R** is H, —OH, —Cl, —I, or C$_1$ to C$_{24}$ hydrocarbyl. Similarly, the use of amino-substituted polymers, prepared by amination of halogenated polymers, can be illustrated as follows:

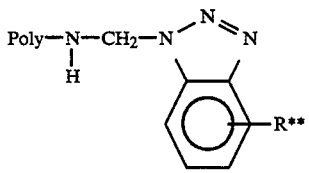

wherein "Poly" represents the balance of the polymer and R** is as defined above.

Generally, from 50 to 100 wt. % (and preferably from 80 to 100 wt. %) of the N atoms in the amino-substituted polymer will be primary and/or secondary, and therefore reactive with the aldehyde and heterocyclic nitrogen reactants, and preferably at least about 10 wt. % of the reactive N atoms (e.g., from 10 to about 100 wt. %), and more preferably at least about 50 wt. % (e.g., from 50 to about 100 wt. %) of the reactive N atoms in the amino-substituted polymer will be reacted with the aldehyde and heterocyclic nitrogen reactant to form >N-ald-hetero N groups (wherein "ald" is the linking unit derived from the aldehyde reactant and "hetero N" is the residue of the heterocyclic nitrogen reactant).

The Mannich base derivatives of the amino-substituted polymers prepared by the process of this invention are soluble in common organic solvents and in mineral oils. The novel polymers of this invention are useful in oleaginous compositions as dispersant-viscosity index improver additives or as dispersant additives, and possess antioxidant and antiwear properties. The polymers of this invention are characterized by improved thermooxidative and thermal stability properties compared to the amino-substituted polymers from which they are prepared. The polymers of this invention also find utility in other applications such as thermoplastic systems, and are capable of being cast into coherent films, additives for conventional thermoplastics, and the like. As pointed out above, the products of this invention prepared from amino-substituted polymers having (a) a $\overline{M}_n$ of from 500 to 10,000 (preferably from 800 to 5,000) are useful as dispersant additives in oleaginous compositions and (b) a $\overline{M}_n$ of from greater than 10,000 to 200,000 or more (preferably from 20,000 to 150,000) are useful as viscosity index improver dispersants in oleaginous compositions.

OLEAGINOUS COMPOSITIONS

The additives of the present invention can be incorporated into a lubricating oil (or a fuel in any convenient way. Thus, these mixtures can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the additives can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such additive concentrates will typically contain (on an active ingredient (A.I.) basis) from about 3 to about 45 wt. %0 and preferably from about 10 to about 35 wt. %, of the additives of the present invention, and typically from about 30 to 90 wt. %, preferably from about 40 to 60 wt. %, base oil, based on the concentrate weight.

The additives of the present invention possess very good dispersant and antioxidant properties as measured herein in a wide variety of environments. Accordingly, the additives are used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of the invention. Such materials can be mixed with the hydrocarbon fuel in varying amounts of up to about 10-20% or more. For example, alcohols such as methanol, ethanol, propanol and butanol, and mixtures of such alcohols are included in commercial fuels in amounts of up to about 10%. Other examples of materials which can be mixed with the fuels include diethyl ether, methyl ethyl ether, methyl tertiary butyl ether, and nitromethane. Also within the scope of the invention are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl-4-methylphenol, rust inhibitors, bacteriostatic agents, gum inhibitors, metal deactivators, upper cylinder lubricants and the like.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc., as described in U.S. Pat. No. 4,797,219, the disclosure of which is hereby incorporated by reference in its entirety. Some of these numerous additives can provide a multiplicity of effects, e.g., a dispersant-oxidation inhibitor. This approach is well known and need not be further elaborated herein.

In the preparation of lubricating oil formulations it is common practice to introduce the additives in the form of 10 to 80 wt. %, e.g., 20 to 80 wt. % active ingredient concentrates in hydrocarbon oil, e.g., mineral lubricating oil, or other suitable solvent. Usually these concentrates may be diluted with 3 to 100, e.g., 5 to 40 parts by weight of lubricating oil, per part by weight of the additive package, in forming finished lubricants, e.g., crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl) silicate, tetra-(4-methyl-2-ethylhexyl)silicate, tetra-(p-tertbutylphenyl)silicate, hexa-(4-methyl-2-pentoxy) disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
| --- | --- | --- |
| Viscosity Modifier | 0.01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

The multi-functional viscosity index improvers of the instant invention may be utilized in a concentrate form, e.g., from about 5 wt. % up to about 50 wt. %, preferably 7 to 25 wt. %, in oil, e.g., mineral lubricating oil, for ease of handling, and may be prepared in this form by carrying out the reaction of the invention in oil as previously discussed.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

EXAMPLE 6

13.2 ml. of 5-norbornene-2-methylamine (NBMA) (12.8 gm.) was added to 200 ml of hexane. To this solution was added 81 ml. of a 20 wt. % solution of diisobutyl aluminum hydride (DIBAL-H) in hexane at 20° C. under a nitrogen blanket over a period of 90 seconds. The resultant solution containing the MNCM was introduced into the polymerization reactor to prepare an amino-substituted EP interpolymer. The conditions of polymerization are shown in Table V and the results in Table VI:

TABLE V

| Conditions |
| --- |
| Reactor = 3.875 liter (CFSTR) |
| Temperature = 30° C. |
| Pressure = 500 kPa gauge |
| Agitation = 1200 rpm |
| Residence Time = 9 min. |
| Al/V Molar Ratio = 10 for catalyst compounds |
| Feeds |
| Hexane = 4.22 kg/hr. |
| Ethylene = 67.5 g/hr. |
| Propylene = 162.1 g/hr. |
| $VCl_4$ = 0.646 g/hr. |
| EADC = 4.25 g/hr. |
| Hydrogen = 120 w ppm on ethylene |
| NCM (masked as above) = 1.917 g/hr. |

TABLE VI

| Polymerization Parameters | | Polymer Proportion | | |
| --- | --- | --- | --- | --- |
| Rate (g/hr) | Catalyst Efficiency (g/g) | Ethylene Content (wt %) | $M_L(1 + 4)$ (125° C.) | MNCM (conv %) |
| 173 | 267 | 36.8 | 6.7 | 92 |

The resulting amine grafted ethylene propylene polymer was isolated as follows. 500 ml. of the hexane solution was mixed with a 10% solution of diluted HCl in 500 ml. of 1:1 water and i-PA at 65° C. for 1 hour. At the end of the period, the water layer was removed and the supernatent hexane layer was washed with 500 ml. of water. The pH of the hexane layer was adjusted to 7 and the polymer recovered by evaporation of solvent.

EXAMPLE 7

Into a 500 ml. reaction flask was introduced 10 g. of the amino-substituted interpolymer produced as in Example 6, dissolved in 200 ml. of THF. The mixture was stirred at room temperature, and a solution of 0.8 ml. of 37% formaline (0.01 mole) was added to the above polymeric solution. Then 1.31 g. (0.011 mole) benzotriazole, dissolved in 50 ml. THF, was added. The entire mixture was stirred for 12 hours at room temperature. Then, the THF and water was removed on rotary evaporator. The solid obtained was washed with acetone and dried. Analysis: 0.196 wt. % N.

The product polymer analyzed for 0.196 wt % N, compared to the 0.06 wt % N in the amino-substituted polymer charged to the Mannich Base reaction zone. FTIR spectra of the Mannich base polymer product so obtained showed characteristic absorption peaks due to benzotriazole along with peaks due to the parent polymer. The Mannich base polymer product was found to be soluble in tetrahydrofuran, heptane, xylene and mineral lubricating oil.

The above benzotriazole-EPDM polymer Mannich Base product was analyzed by thermal gravimetric analysis under air (Perkin Elmer II model) to determine the polymer's thermooxidative stability. A TGA analysis of the amino-substituted interpolymer of Example 6 was also made as a comparison. The data thereby obtained are illustrated in FIG. 1. These data indicate that the 365° C. onset decomposition (in air) of the amino-substituted interpolymer of Example 6 was increased to 430° C. for the product of Example 7. These data indicate the benzotriazole EPDM reacted polymer is more stable than its amino-substituted polymer presursor by about 40° C. at a weight loss of 50 wt %.

EXAMPLE 8

The procedure of Example 7 was repeated employing 7.4 g of the amino-substituted polymer produced as in Example 6, dissolved in 100 ml of THF, except that 0.00074 mole of formaline was added (as the 37% formaline solution), and 0.075 g (0.000635 mole) of benzotriazole dissolved in 20 ml was employed. The THF was evaporated by stripping with dry gaseous $N_2$, and the solid product was washed with acetone and dried. The product thereby obtained was found by analysis to contain 0.184 wt. % N.

The benzotriazole Mannich base polymer product of Example 8 was then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyl-dithiophosphate anti-wear additive. The oil contained no sludge dispersant. A quantity of such used oil was acquired by draining and refilling the taxicab crankcase at 1000–2000 mile intervals.

The SIB test was conducted in the following manner: the aforesaid used crankcase oil, which was milky brown in color, was freed of sludge by centrifuging for one hour at about 39,000 gravities (gs.). The resulting clear bright red supernatant oil was then decanted from the insoluble sludge particles thereby separate out. However, the supernatant oil still contained oil-soluble sludge precursors which on heating under the conditions employed by this test will tend to form additional oil-insoluble deposits of sludge. The sludge inhibiting properties of the additives being tested were determined by adding to portions of the supernatant used oil, a small amount of the particular additive being tested. Ten grams of each blend being tested were placed in a stainless steel centrifuge tube and were heated at 135° C. for 16 hours in the presence of air. Following the heating, the tube containing the oil being tested was cooled and then centrifuged for about 30 minutes at room temperature at about 39,000 gs. Any deposits of new sludge that form in this step were separated from the oil by decanting the supernatant oil and then carefully washing the sludge deposits with 25 ml of heptane to remove all remaining oil from the sludge and further centrifuging. The weight of the new solid sludge that forms in the test, in milligrams, was determined by drying the residue and weighing it. The results were reported as amount of precipitated sludge in comparison with the precipitated sludge of a blank not containing any additional additive, which blank was normalized to a rating of 10. The less new sludge precipitated in the presence of the additive, the lower the SIB value and the more effective was the additive as a sludge dispersant. In other words, if the additive gave half as much precipitated sludge as the blank, then it would be rated 5.0 since the blank will be normalized to 10.

The VIB test was used to determine varnish inhibition. Here, each test sample consists of 10 grams of lubricating oil containing a small amount of the additive being tested. The test oil to which the additive was admixed was of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent SO$_2$, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish imposed on the walls was rated to values of from 1 to 11 with the higher number being the greater amount of varnish, in comparison with a blank with no additive that is rated 11.

10.00 grams of SIB test oil are mixed with the indicated amount of the products of Example 8 and tested in the aforedescribed SIB and VIB tests. The data thereby obtained are summarized in Table VI below.

TABLE VI

| Charge Amount | Example 8 Product: SIB, mg | VIB rating |
|---|---|---|
| 0.08 g | 7.42 | 10 |
| 0.16 g | 5.23 | 5 |
| 0.24 g | 2.19 | 1–2 |
| 0.50 g | 2.58 | 1–2 |

The above data illustrate the slude and varnish inhibiting properties of the products of this invention.

From the foregoing description, one skilled in the art can easily ascertain the essential characteristics of this invention and, without departing from the spirit and scope thereof, make various changes and modifications of the invention to adapt it to various usages and conditions.

What is claimed is:

1. A fuel oil composition comprising a fuel oil and an oil soluble nitrogen-containing antioxidant additive which comprises a Mannich Base adduct of at least one oil soluble amino-substituted polymer, at least one aldehyde reactant and at least one heterocyclic reactant containing a 5- or 6- membered heterocyclic ring in which nitrogen atoms are the only hetero atoms and in which at least one —N(H)— group is present in the heterocyclic ring.

2. The composition of claim 1, wherein said amino-substituted polymer comprises an amino-substituted interpolymer and is formed by a process which comprises:

(a) reacting at a temperature of less than 60° C. (i) at least one monomer having a general formula of:

$$R^1(X)_n$$

wherein $R^1$ comprises an ethylenically unsaturated hydrocarbyl radical, n is an integer of at least 1, and X is selected from the group consisting of imino, primary amino, secondary amino, and cyano groups, with (ii) a masking agent comprising at least one metallic compound to form the corresponding masked nitrogen-containing monomers; and (b) polymerizing polymer chain monomers with said masked, nitrogen-containing monomer to produce a polymerization product comprising a polymer chain including masked, nitrogen-containing monomer; and (c) deashing said polymerization product and recovering said amino-substituted interpolymer.

3. The composition of claim 2, wherein said masking agent comprises a non-halogenated metallic compound and said amino-substituted interpolymer comprises less than 0.10% by weight of halogen.

4. The composition of claim 2, wherein said amino-substituted interpolymer comprises less than 0.03% by weight of halogen.

5. The composition of claim 2, wherein $R^1$ contains less than 25 carbon atoms.

6. The composition of claim 5, wherein $R^1$ contains not greater than 16 carbon atoms.

7. The composition of claim 5, wherein $R^1$ is selected from the group consisting of radicals from alpha-olefins, norbornene and alkyl-substituted norbornenes.

8. The composition of claim 5, wherein said $R^1$ is selected from the group consisting of vinyl and allyl radicals.

9. The composition of claim 6, wherein $R^1$ is selected from the group consisting of radicals derived from alpha-olefins having the general formula of:

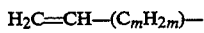

wherein m is an integer of at least one.

10. The composition of claim 9, wherein $R^1$ is selected from the group consisting of radicals from norbornene and homologues of norbornene having the general formula of:

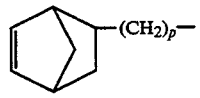

wherein p is an integer of at least one.

11. The composition of claim 10, wherein said nitrogen-containing monomer is selected from the group consisting of norbornene methyl amines and norbornene carboximines.

12. The composition of claim 2, wherein said norbornene methylamine is 5-norbornene-2-methylamine.

13. The composition of claim 7, wherein said non-halogenated metallic compound is an organometallic compound of the formula:

wherein M is a member selected from Group IB, IIA, IIB, IIIA, IVA, and the transition metals elements, Y is at least one of $R^2$, $R^3$, $R^4$ and $R^5$, wherein $R_2$–$R^5$ are independently selected from the group consisting of hydrogen, and non-halogenated $C_1$–$C_{16}$ hydrocarbyl radicals, and non-halogenated $C_1$–$C_{16}$ hydrocarbyloxy radicals and r is an integer of from 1 to 4.

14. The composition of claim 13, wherein said non-halogenated $C_1$–$C_{16}$ radicals are selected from the group consisting of $C_1$–$C_{16}$ alkyl, $C_1$–$C_{16}$ aryl, and $C_1$–$C_{16}$ alkoxy.

15. The composition of claim 14, wherein $R^2$–$R^5$ are non-halogenated members independently selected from the group consisting of hydrogen, methyl, ethyl, propyl, isopropyl, butyl, isobutyl, tertiary butyl, pentyl, hexyl, phenyl, tolyl, ethylphenyl, naphthyl, methoxy, ethoxy, propoxy, hexoxy, pentoxy, phenoxy, methylphenoxy, iso-butoxy and tertiary butoxy.

16. The composition of claim 12, wherein M is an element selected from the group consisting of aluminum, magnesium, and zinc.

17. The composition of claim 16, wherein said organometallic compound is selected from the group consisting of triisobutylaluminum, triethylaluminum, diisobutyl aluminum hydride, diethylzinc, and di-n-hexylmagnesium 18. The composition of claim 17, wherein said organometallic compound is selected from the group consisting of triisobutylaluminum, triethylaluminum, and diisobutyl aluminum hydride.

19. The composition of claim 2, wherein said polymer chain monomers are polymerized with said masked, nitrogen-containing monomer in the presence of a Group IVB or VB metal-containing polymerization catalyst.

20. The composition of claim 19, wherein said polymerization catalyst comprises at least one member selected from the group consisting of vanadium compounds, titanium compounds and zirconium compounds.

21. The composition of claim 20, wherein said vanadium compounds include a member selected from the group consisting of vanadium halides, vanadium oxyhalide and vanadium salts of beta-diketonates.

22. The composition of claim 21, wherein said vanadium halide is vanadium tetrachloride.

23. The composition of claim 22, wherein said vanadium oxyhalide compound has a general formula of $$VOX_n(OR^a)_{3-n}$$

where n is an integer of 2 or 3, $R^a$ is a hydrocarbyl radical and X is a halogen.

24. The composition of claim 23, wherein said $R^a$ hydrocarbyl radical is selected from the group consisting of alkyl, phenyl, and benzyl radicals.

25. The composition of claim 24, wherein said alkyl radicals of said vanadium oxyhalide compound are members selected from the group consisting of $C_1$–$C_{10}$ alkyls.

26. The composition of claim 2, wherein said polymer chain monomers are a mixture consisting essentially of ethylene and propylene.

27. The composition of claim 26, wherein said interpolymer comprises about 20 wt. % to 90 wt. % ethylene and about 10 wt. % to 80 wt. % propylene.

28. The composition of claim 2, wherein said masked, nitrogen-containing monomers are present in a range of about 0.01 wt. % to 40 wt. % by total weight of said amino-substituted interpolymer.

29. The composition of claim 28, wherein said amount of said masked, nitrogen-containing monomers is within the range of about 0.1 wt. % to 10 wt. % by total weight of said amino-substituted interpolymer.

30. The fuel oil composition of claim 2, wherein said masked amino-substituted interpolymer is contacted with an aqueous liquid in said de-ashing step.

31. The fuel oil composition of claim 30, wherein said polymerization product comprises said masked, nitrogen-containing polymer, polymerization catalyst, and unreacted nitrogen-containing monomers, and said de-ashing is effected by contacting said polymerization product with a liquid selected from the group consisting of water, aqueous mineral acid solutions, and aqueous mineral base solutions.

32. The fuel oil composition of any of claims 1 to 31, wherein said heterocyclic reactant comprises at least one heterocyclic compound of the formula:

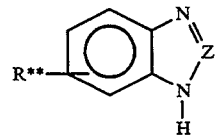

wherein Z is N, C(H) or C(R*) and R** is H, —OH, —Cl, —I or —R*, wherein R* is $C_1$ to $C_{24}$ hydrocarbyl.

33. The fuel oil composition of claim 32 wherein Z is N and R** is H, —OH, —Cl, —I or —R* wherein R* is $C_1$ to $C_3$ alkyl.

34. The fuel oil composition of claim 33 wherein said aldehyde is formaldehyde or paraformaldehyde.

35. The fuel oil composition of claim 34 wherein said heterocyclic reactant comprises benzotriazole or tolyltriazole.

36. The fuel oil composition of claim 1, wherein said amino-substituted polymer has a number average molecular weight of from 500 to 500,000.

37. The fuel oil composition of claim 1, wherein said amino-substituted interpolymer has a molecular weight distribution of from 1.0 to 20.

38. The fuel oil composition of claim 1, wherein said amino-substituted interpolymer has a number average molecular weight of from 800 to 5,000.

39. The fuel oil composition of claim 38, wherein said amino-substituted polymer has a molecular weight distribution of from 1.5 to 15.

40. A fuel oil concentrate comprising a solvent and/or diluent and the oil soluble additive of claim 1.

41. The fuel oil composition of claim 1 containing from about 0.001 to 0.5 wt. % of the oil soluble additive.

* * * * *